(12) United States Patent
Kudo et al.

(10) Patent No.: US 9,595,844 B2
(45) Date of Patent: Mar. 14, 2017

(54) ELECTRIC POWER CONTROL SYSTEM, BATTERY CONTROL SYSTEM, BATTERY CONTROL DEVICE, BATTERY CONTROL METHOD, AND RECORDING MEDIUM

(75) Inventors: Koji Kudo, Tokyo (JP); Hitoshi Yano, Tokyo (JP); Hisato Sakuma, Tokyo (JP); Takayuki Shizuno, Tokyo (JP); Toshiya Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 14/345,633

(22) PCT Filed: Aug. 8, 2012

(86) PCT No.: PCT/JP2012/070135
§ 371 (c)(1),
(2), (4) Date: Mar. 18, 2014

(87) PCT Pub. No.: WO2013/042474
PCT Pub. Date: Mar. 28, 2013

(65) Prior Publication Data
US 2015/0002100 A1 Jan. 1, 2015

(30) Foreign Application Priority Data
Sep. 21, 2011 (JP) .................................. 2011-205596

(51) Int. Cl.
*H02J 7/00* (2006.01)
*H02J 3/32* (2006.01)
(Continued)

(52) U.S. Cl.
CPC ................ *H02J 7/007* (2013.01); *H02J 3/32* (2013.01); *H02J 3/46* (2013.01); *H02J 13/0062* (2013.01);
(Continued)

(58) Field of Classification Search
USPC .................................. 320/125, 132, 134, 136
See application file for complete search history.

(56) References Cited

U.S. PATENT DOCUMENTS 6,741,065 B1 5/2004 Ishii et al.
8,723,527 B2 * 5/2014 Kudo .................... B60L 3/0046
320/125
(Continued)

FOREIGN PATENT DOCUMENTS

DE 60033833 T2 1/2008
EP 2214283 A2 8/2010
(Continued)

OTHER PUBLICATIONS

International Search Report corresponding to PCT/JP2012/070135 dated Nov. 13, 2012 (5 pages).
(Continued)

*Primary Examiner* — Brian Ngo
(74) *Attorney, Agent, or Firm* — Wilmer Cutler Pickering Hale and Dorr LLP

(57) ABSTRACT

A battery control system that communicates by way of a communication network with a plurality of batteries that are connected to an electric power system includes: communication characteristics detection means that detects characteristics of communication paths between the batteries and the battery control system for each of the plurality of batteries; selection means that, based on the detection results of the communication characteristics detection means, selects from among the plurality of batteries each battery that uses a communication path having characteristics within a predetermined range of communication characteristics as a candidate of a regulating battery that is to be used for regulating the electric power of the electric power system, and that selects regulating batteries from among candidates of regulating batteries based on predetermined conditions;

(Continued)

and control means that supplies operation instructions that instruct the regulating batteries to charge or discharge.

10 Claims, 14 Drawing Sheets

(51) Int. Cl.
 *H02J 3/46* (2006.01)
 *H02J 13/00* (2006.01)
 *H04B 17/391* (2015.01)

(52) U.S. Cl.
 CPC .... *H04B 17/391* (2015.01); *H02J 2007/0098* (2013.01); *Y02E 60/722* (2013.01); *Y02E 60/7838* (2013.01); *Y04S 10/14* (2013.01); *Y04S 40/124* (2013.01)

(56) References Cited

U.S. PATENT DOCUMENTS

| | | | |
|---|---|---|---|
| 2008/0088279 A1* | 4/2008 | Lim | G01R 19/16542 320/134 |
| 2008/0136376 A1* | 6/2008 | Nebrigic | H02J 7/0034 320/136 |
| 2009/0079397 A1* | 3/2009 | Ibrahim | H02J 7/0029 320/136 |
| 2010/0007333 A1 | 1/2010 | Sekiguchi et al. | |
| 2010/0191996 A1 | 7/2010 | Iino et al. | |
| 2011/0068746 A1 | 3/2011 | Rocci et al. | |
| 2011/0109273 A1* | 5/2011 | Tamezane | H02J 7/0077 320/132 |
| 2011/0234164 A1* | 9/2011 | Furukawa | H02J 7/0018 320/118 |
| 2014/0217989 A1* | 8/2014 | Kudo | H02J 3/32 320/134 |

FOREIGN PATENT DOCUMENTS

| | | |
|---|---|---|
| JP | 2002-152976 | 5/2002 |
| JP | 2006-094648 | 4/2006 |
| JP | 2009-065766 | 3/2009 |
| JP | 2010-233353 | 10/2010 |
| JP | 2011-182609 | 9/2011 |

OTHER PUBLICATIONS

Extended European Search Report corresponding to European Application No. 12834176.5, Sep. 25, 2015, 5 pages.

* cited by examiner

Drops in output are handled among battery groups belonging to portions with diagonal lines.

Fig.18

| Group Name | Communication Delay Time | Number of ES | Maximum Output | Amount of Electric Power that can be Supplied |
|---|---|---|---|---|
| ES101 | 1sec±100msec | 1,000,000 ES | 1GW | 2GWh |
| ES102 | 100msec±10msec | 200,000 ES | 200MW | 400MWh |
| ES103 | 10msec±1msec | 200,000 ES | 20MW | 60MWh |
| ES104 | 1msec or less | 10,000 ES | 10MW | 20MWh |

ELECTRIC POWER CONTROL SYSTEM, BATTERY CONTROL SYSTEM, BATTERY CONTROL DEVICE, BATTERY CONTROL METHOD, AND RECORDING MEDIUM

CROSS-REFERENCE TO RELATED APPLICATIONS

This application is a national stage application of International Application No. PCT/JP2012/070135 entitled "Battery Control System, Battery Control Device, Battery Control Method, and Recording Medium," filed on Aug. 8, 2012, which claims the benefit of the priority of Japanese patent application No. 2011-205596, filed on Sep. 21, 2011, the disclosures of each of which are hereby incorporated by reference in their entirety.

TECHNICAL FIELD

The present invention relates to a battery control system, a battery control device, a battery control method, and a recording medium, and more particularly relates to a battery control system, a battery control device, a battery control method, and a recording medium for controlling charging or discharging of batteries that are connected to an electric power system.

BACKGROUND ART

The output control of thermal power generation is mainly used as a method of regulating electric power supply and demand in the electric power system, and pumped storage hydroelectricity (pumping-up power generation) is properly combined with it.

However, since renewable power sources, as represented by photovoltaic power generation or wind power generation in which the electric power generation depends on weather, are incorporated as distributed power sources into electric power systems now and in the future, the concern arises that these distributed power sources may have an adverse impact on the balance of power supply and demand.

The concern arises that techniques of regulating power supply and demand that focus on thermal power generation may be inadequate to compensate for fluctuations in power supply and demand that are caused by these distributed power sources. As a result, new techniques for regulating power supply and demand are now considered imperative.

One proposal of a new technique for regulating power supply and demand is the utilization of distributed energy storage such as "storage batteries" or electric vehicles (EV), which are linked to the distribution network of an electric power system, that is expected to come into wide use. Energy storage is hereinbelow abbreviated and referred to as "ES."

Storage battery SCADA (Supervisory Control and Data Acquisition) that is installed, for example, in a distributing substation has been proposed as a system for controlling distributed ES that is linked to a distribution network. Storage battery SCADA implements regulation of power supply and demand through the use of various types of ES (such as LIB, NAS, NiH, and lead storage batteries) having different specifications and performance, such as storage batteries for regulating demand and storage batteries for consumers.

Patent Document 1 describes an electric power system controller that regulates power supply and demand through the use of consumer-side secondary batteries (ES) as well.

Storage battery SCADA and the power system controller described in Patent Document 1 transmit operation instructions relating to charging operations or discharging operations to each storage battery by way of a communication network. Upon receiving operation instructions by way of communication paths within the communication network, each storage battery carries out charging operations or discharging operations in accordance with the operation instructions.

LITERATURE OF THE PRIOR ART

Patent Documents

Patent Document 1: JP2006-094648

SUMMARY OF THE INVENTION

Problem to be Solved by the Invention

Operation instructions transmitted from a storage battery SCADA or the power system controller described in Patent Document 1 (hereinbelow collectively referred to as "transmission origin") are received in each storage battery by way of different communication paths within the communication network.

Variations in characteristics (for example, communication delay time characteristics or communication error characteristics) are present in each communication path within a communication network. As a result, variations occur in the reception conditions of operation instructions in each storage battery due to variations in the characteristics of each communication path, whereby the accuracy of regulation of power supply and demand deteriorates.

It is therefore an object of the present invention to provide a battery control system, a battery control device, a battery control method, and a recording medium that can suppress degradation of the accuracy of power supply/demand regulation when the regulation of power supply and demand is carried out through the use of a plurality of batteries that are connected to an electric power system.

Means for Solving the Problem

A battery control system of the present invention is a battery control system that communicates by way of a communication network with a plurality of batteries that are connected to an electric power system, wherein the battery control system includes:

communication characteristics detection means that, for each of the plurality of batteries, detects characteristics of communication paths between the batteries and the battery control system within the communication network;

selection means that, based on the detection results of the communication characteristics detection means, selects, from among the plurality of batteries, each battery that uses a communication path having characteristics within a predetermined communication characteristics range, as a candidate for a regulating battery that is to be used for regulating electric power of the electric power system, and that selects regulating batteries from among candidates for regulating batteries based on predetermined conditions; and control means that supplies operation instructions that instruct charging or discharging to the regulating batteries that were selected in the selection means.

A battery control device of the present invention is a battery control device that controls the operation of a battery that is connected to an electric power system and includes:

communication means; and control means that, when the communication means receives inspection information for detecting characteristics of a communication path that is being used by the battery, transmits predetermined information from the communication means to the transmission origin of the inspection information, and when the communication means receives an operation instruction that stipulates an operation of charging or discharging of the battery, controls the battery based on the operation instruction.

A battery control method of the present invention is a battery control method of a battery control system that communicates by way of a communication network with a plurality of batteries that are connected to an electric power system, the battery control method including:

for each of the plurality of batteries, detecting characteristics of communication paths between the batteries and the battery control system within the communication network;

selecting, from among the plurality of batteries, each battery that uses a communication path having characteristics within a predetermined communication characteristic range, as a candidate of a regulating battery that is to be used for regulating electric power of the electric power system, and selecting, from among candidates of regulating batteries, regulating batteries based on predetermined conditions; and supplying, to the regulating batteries, operation instructions that instruct charging or discharging.

The battery control method of the present invention is a battery control method in a battery control device that controls the operation of batteries that are connected to an electric power system, the battery control method including:

upon receiving inspection information for detecting characteristics of communication paths being used by the batteries, transmitting predetermined information to the transmission origin of the inspection information, and upon receiving an operation instruction that stipulates an operation of charging or discharging the batteries, controlling the batteries based on the operation instruction.

The recording medium of the present invention is a recording medium that can be read by a computer and on which a program is recorded that causes a computer to execute:

a communication characteristics detection procedure of detecting, for each of a plurality of batteries that are connected to an electric power system, characteristics of the communication path between the battery and the computer;

a selection procedure of selecting, from among the plurality of batteries, each battery that uses a communication path having characteristics within a predetermined communication characteristics range as a candidate of a regulating battery that is to be used for regulating electric power of the electric power system, and selecting, from among candidates of regulating batteries, regulating batteries based on predetermined conditions; and a control procedure of supplying to the regulating batteries operation instructions that instruct charging or discharging.

The recording medium of the present invention is a recording medium that can be read by a computer and on which a program is recorded that causes a computer to execute a procedure of: upon receiving inspection information for detecting characteristics of communication paths that are being used by batteries that are connected to an electric power system, transmitting predetermined information to the transmission origin of the inspection information, and upon receiving an operation instruction that stipulates an operation of charging or discharging of the batteries, controlling the batteries based on the operation instruction.

Effect of the Invention

According to the present invention, degradation of the precision of the regulation of power supply and demand can be suppressed by controlling charging or discharging of batteries that use communication paths having characteristics within a predetermined communication characteristics range to regulate the electric power of the electric power system.

BRIEF DESCRIPTION OF THE DRAWINGS

FIG. 2 is a block diagram showing an example of ES 5a.

FIG. 18 shows an example of the results of specification in table format.

MODE FOR CARRYING OUT THE INVENTION

Exemplary embodiments of the present invention are next described with reference to the accompanying figures.
First Exemplary Embodiment FIG. 1 shows a power control system that adopts the battery control system of the first exemplary embodiment of the present invention.

Figure 1:
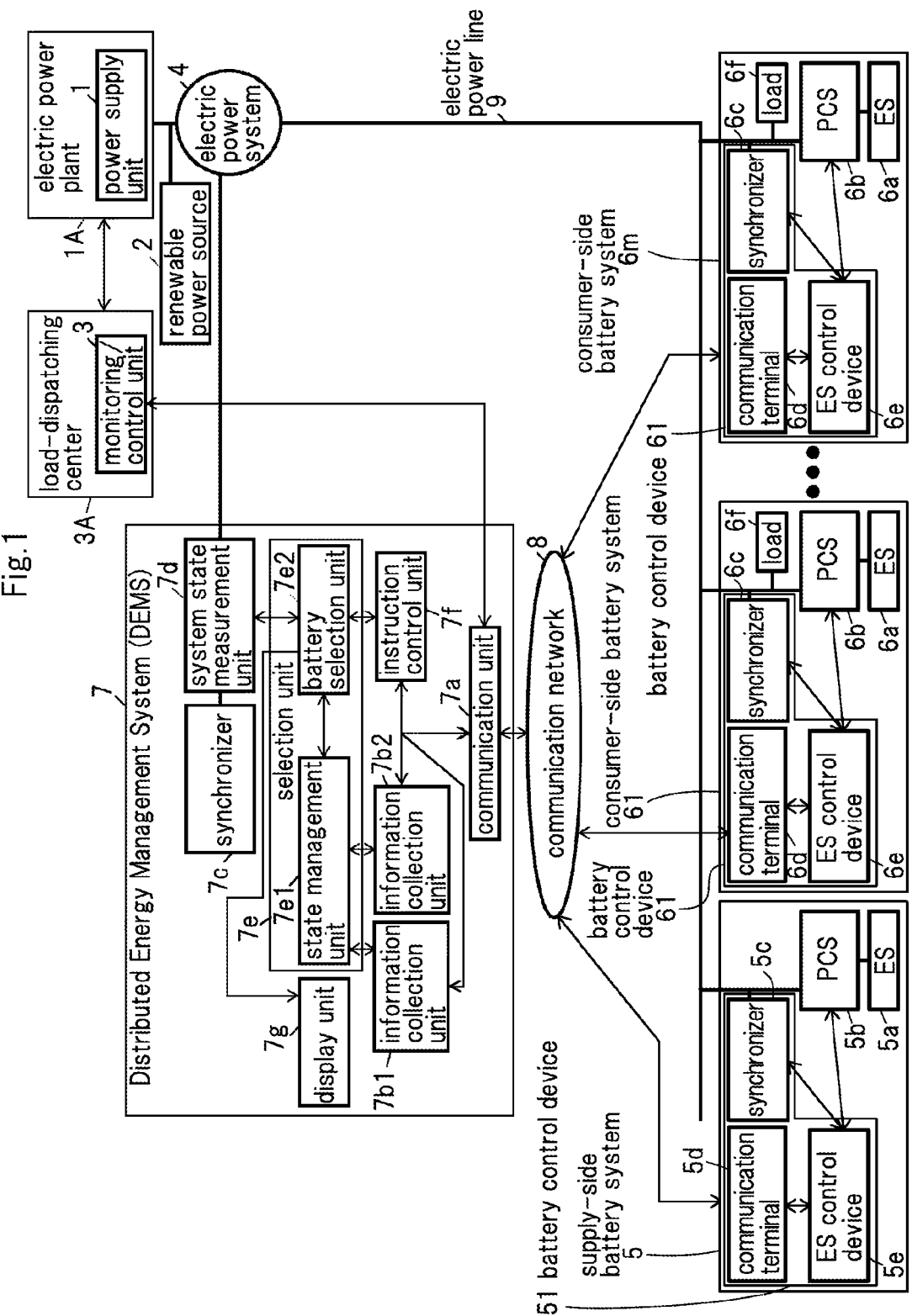
FIG. 1 shows an electric power control system that adopts the battery control system of the first exemplary embodiment of the present invention.

In FIG. 1, the power control system includes: power supply unit 1, renewable power source 2, monitoring/control unit 3, electric power system 4, supply-side battery system 5, consumer-side battery systems 61-6m (where m is an integer equal to or greater than 2), DEMS (distributed energy management system) 7, and communication network 8.

Although only one supply-side battery system 5 is shown in FIG. 1, there may be a plurality of supply-side battery systems 5. In the present exemplary embodiment, it is assumed that there is a plurality of supply-side battery systems 5.

In addition, supply-side battery system 5 and consumer-side battery systems 61-6m use packets to communicate with DEMS 7.

Power supply unit 1 is an electric generator such as a thermal power generator that is provided in electric power plant 1A. Power supply unit 1 supplies electric power that is generated in electric power plant 1A.

Renewable power source 2 is, for example, a photovoltaic generation apparatus. However, renewable power source 2 is not limited to a photovoltaic power generation apparatus and can be altered as appropriate, and may also take the form of a wind power generation apparatus, a hydroelectric power generator (including small hydroelectric generators that generate electric power of 1000 kilowatts or less), a geothermal power generation apparatus, or a power supply in which these generation apparatuses are mixed. In addition, renewable power source 2 may be provided in supply-side battery system 5 or in consumer-side battery systems 61-6m and connected to electric power line 9.

Monitoring/control unit 3 is provided in load-dispatching center 3A. Monitoring/control unit 3 communicates with DEMS 7. Communication lines for sending instructions from load-dispatching center 3A to electric power plant 1A are present between load-dispatching center 3A and electric power plant 1A. In addition, load-dispatching center 3A is, for example, a central load-dispatching center or a regional load-dispatching center.

Electric power system 4 is a system for supplying electric power to the consumer side, includes components such as transformers, changes the voltage of generated electric power from power supply unit 1 or renewable power source 2 to a predetermined voltage, and supplies electric power having the predetermined voltage to electric power line 9. Electric power plant 1A, renewable power source 2, and electric power line 9 are typically included in electric power system 4, but electric power system 4, electric power plant 1A, renewable power source 2, and electric power line 9 are shown separately in FIG. 1 for the sake of simplifying the explanation.

Supply-side battery system 5 is managed on the electric power supply side (for example, an electric power company) that manages electric power plant 1A and load-dispatching center 3A.

Supply-side battery system 5 includes ES 5a, power conditioning system (hereinbelow referred to as "PCS") 5b that includes AC/DC converters, synchronizer 5c, communication terminal 5d, and ES control device 5e. In addition, synchronizer 5c, communication terminal 5d, and ES control device 5e are contained in battery control device 51.

ES 5a is, for example, a secondary battery in a stationary storage battery or an electric vehicle.

Figure 2:
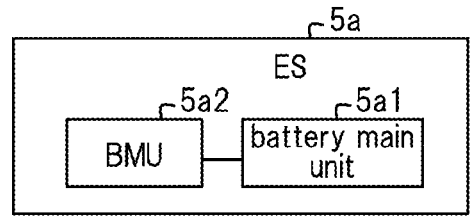

FIG. 2 is a block diagram that shows an example of ES 5a.

In FIG. 2, ES 5a includes battery main unit 5a1 and BMU (Battery Management Unit) 5a2 that controls the operations (charging operations and discharging operations) of battery main unit 5a1.

BMU 5a2 recognizes the characteristics of battery main unit 5a1, i.e., the characteristics of ES 5a.

As the characteristics of ES 5a in the present exemplary embodiment, BMU 5a2 recognizes:

(a-1) the residual capacity of ES 5a,
(a-2) the SOC (State of Charge) of ES 5a,
(a-3) the maximum charge/discharge output of ES 5a, and
(a-4) the maximum continuous charge/discharge time (the maximum continuous charge/discharge time interval at the maximum charge/discharge output) of ES 5a.

The characteristics of ES 5a that are recognized by BMU 5a2 are not limited to those described above and may be altered as appropriate.

BMU 5a2 stores IDs that are the identification information of ES 5a.

Battery control device 51 may also have the function of recognizing the characteristics of ES 5a that are described in (a-1)-(a-4) above.

At the time of charging of ES 5a, PCS 5b shown in FIG. 1 converts the AC voltage, which is provided from electric power line 9, to a DC voltage, and supplies this DC voltage to ES 5a. At the time of discharging ES 5a, PCS 5b converts the DC voltage, which is provided from ES 5a, to an AC voltage, and supplies this AC voltage to electric power line 9.

Synchronizer 5c supplies time and date information for synchronization. In the present exemplary embodiment, synchronizer 5c uses a GPS (Global Positioning System) receiver (not shown) to supply time and date information of GPS.

Communication terminal 5d can typically be referred to as communication means.

Communication terminal 5d communicates with DEMS 7 via communication network 8. Communication terminal 5d receives from DEMS 7, for example, a characteristics request for requesting the characteristics of ES, an operation instruction for instructing charging or discharging, or an operation halt instruction for halting an operation that corresponds to an operation instruction. A characteristics request is an example of inspection information that is used to detect the characteristics of communication paths being used by ES 5a. In addition, communication terminal 5d transmits to DEMS 7 battery characteristics parameters that indicate characteristics relating to ES 5a. Battery characteristics parameters are also an example of the predetermined information.

ES control device 5e can typically be referred to as control means.

ES control device 5e controls ES 5a based on instructions from DEMS 7 that are received by communication terminal 5d. For example, ES control device 5e supplies charge instructions or discharge instructions to PCS 5b or BMU 5a2 in ES 5a on the basis of operation instructions from DEMS 7.

In addition, when communication terminal 5d receives a characteristics request, ES control device 5e transmits an ID and battery characteristics parameters that represent characteristics relating to ES 5a to DEMS 7.

Consumer-side battery systems 61-6m are managed by the consumers of electric power.

Consumer-side battery systems 61-6m each include ES 6a, PCS 6b, synchronizer 6c, communication terminal 6d, ES control device 6e, and load 6E Synchronizer 6c, communication terminal 6d, and ES control device 6e, are included in battery control device 61.

ES 6a, PCS 6b, synchronizer 6c, communication terminal 6d, and ES control device 6e each have the same functions as ES 5a, PCS 5b, synchronizer 5c, communication terminal 5d, and ES control device 5e, respectively. As a result, explanation regarding ES 6a, PCS 6b, synchronizer 6c, communication terminal 6d, and ES control device 6e is here omitted.

Load 6f is an electric apparatus that a consumer has.

DEMS 7 can typically be referred to as the battery control system. DEMS 7 is provided, for example, in a distributing substation. The installation location of DEMS 7 is not limited to a distributing substation and can be altered as appropriate.

DEMS 7 includes communication unit 7a, information collection units 7b1 and 7b2, synchronizer 7c, system state measurement unit 7d, selection unit 7e, instruction control unit 7f, and display unit 7g. Selection unit 7e includes state management unit 7e1 and battery selection unit 7e2.

Communication unit 7a communicates with each communication terminal 5d and each communication terminal 6d by way of communication network 8.

Information collection unit 7b1 can also typically be referred to as battery characteristics detection means.

Information collection unit 7b1 detects the characteristics of battery relating to each ES 5a and each ES 6a. Information collection unit 7b1 collects the characteristics of battery (battery characteristics parameters) relating to each ES 5a and each ES 6a from each supply-side battery system 5 and each consumer-side battery systems 61-6m at fixed intervals of, for example, 5 seconds. The collection intervals are not limited to 5 seconds and can be altered as appropriate. In addition, information collection unit 7b1 also collects the IDs of each ES 5a and the IDs of each ES 6a together with the characteristics of battery relating to each ES 5a and each ES 6a.

In the present exemplary embodiment, information collection unit 7b1 transmits characteristics requests from communication unit 7a to supply-side battery system 5 and consumer-side battery systems 61-6m, and receives by way of communication unit 7a the battery characteristics parameters and IDs of each ES 5a and each ES 6a that are transmitted from supply-side battery system 5 and consumer-side battery systems 61-6m in response to the characteristics requests.

Information collection unit 7b2 can also be typically referred to as communication characteristics detection means.

Information collection unit 7b2 detects the characteristics of the communication paths within communication network 8 between batteries and DEMS 7 for each of the batteries of ES 5a and ES 6a. Information collection unit 7b2 collects the characteristics of the communication paths used by each battery based on the communication results for the transmission of the characteristics requests and the reception of the battery characteristics parameters and IDs carried out by information collection unit 7b1.

As the characteristics of communication paths, information collection unit 7b2 collects at least one of:

(b-1) communication delay times on the communication paths, (b-2) the packet error rate (PER) of the communication paths, and (b-2) the bit error rate (BER) of the communication paths.

In the present exemplary embodiment, information collection unit 7b2 collects as the characteristics of the communication paths:

(b-1) the communication delay times, (b-2) the PER, and (b-3) the BER.

For example, information collection unit 7b2 collects the time interval obtained by dividing by two the time interval, from the transmission of a characteristics request that is addressed to a particular ES 6a from DEMS 7 until the reception of the battery characteristics parameters and ID from this ES 6a, as the communication delay time on the communication path that was used by this ES 6a.

Alternatively, information collection unit 7b2 may store transmission time information that indicates the time of transmitting a characteristics request address to a particular ES 6a, this ES 6a may transmit to information collection unit 7b2 reception time information that indicates the time of reception of the characteristics request together with battery characteristics parameters and ID, and information collection unit 7b2 may then collect the time, between the transmission time that is indicated by the transmission time information and the reception time that is indicated by the reception time information, as the communication delay time on the communication path that is used by ES 6a.

Information collection unit 7b2 further collects the PER for packets that show the battery characteristics parameters and ID received from a particular ES 6a as the PER on the communication path that was used by that ES 6a.

Information collection unit 7b2 further collects the BER for data in packets that show the battery characteristics parameters and ID that were received from a particular ES 6a as the BER on the communication path that was used by that ES 6a.

Synchronizer 7c supplies date and time information for synchronization. In the present exemplary embodiment, synchronizer 7c uses a GPS receiver (not shown) to supply the date and time information held by the GPS.

System state measurement unit 7d detects the electric power characteristics of the electric power system 4. Examples of electric power characteristics include power flow, voltage, current, frequency, phase, the amount of reactive power, and the amount of active power. System state measurement unit 7d estimates the total demand value of the entire distribution network that includes electric power line 9 at the time of detecting the electric power of electric power system 4 on the basis of the detection results of the electric power characteristics of electric power system 4, and then estimates the total demand curve of the entire distribution network that includes electric power line 9 by stringing the estimation results (total demand value) in a time series. System state measurement unit 7d further adds to the total demand value the date and time information that was supplied by synchronizer 7c at the time of estimating the total demand value. In the present exemplary embodiment, system state measurement unit 7d estimates the total demand value at predetermined estimation periods of five seconds. The predetermined estimation period is not limited to five-second periods and can be altered as appropriate to, for example, 15 minutes.

Selection unit 7e can typically be referred to as selection means.

Selection unit 7e uses a communication characteristics range, which is used for selecting candidates of regulating batteries for regulating the electric power of electric power system 4, (hereinbelow referred to as simply the "communication characteristics range") to select from among each ES 6a those batteries (hereinbelow referred to as "relevant batteries"), which use communication paths having characteristics that are within the communication characteristics range, on the basis of the collection results of information collection unit 7b2. The communication characteristics range that is used for selecting relevant batteries is one example of the predetermined communication characteristics range. The relevant batteries are one example of the candidates of regulating batteries.

Selection unit 7e selects regulating batteries that are to be used for regulating the electric power of electric power system 4 from among the relevant batteries on the basis of predetermined conditions such as the required amount of electric power or the required battery characteristics.

State management unit 7e1 stores the collection results of each of information collection units 7b1 and 7b2.

State management unit 7e1 updates the collection results of information collection unit 7b1 to the most recent collection results.

State management unit 7e1 further additionally stores the collection results of information collection unit 7b2 for each ES. In the present exemplary embodiment, state management unit 7e1 further totalizes on a ES basis the communication characteristics of communication paths for each ES (each of (b-1) communication delay time, (b-2) PER, and (b-3) BER), which are the collection results of information collection unit 7b2, calculates the average values of these totalized results, and also stores the average values.

Battery selection unit 7e2 stores the battery characteristics range and the communication characteristics range.

Battery selection unit 7e2 predicts total future demand curve based on the total demand curve that was estimated in the past by system state measurement unit 7d. Battery selection unit 7e2 selects batteries (regulating batteries) that are to be used in a process of cutting peaks in total future demand curves (hereinbelow referred to as a "peak-cutting process").

In the present exemplary embodiment, battery selection unit 7e2 selects relevant batteries from among each ES 6a when there is a portion (hereinbelow referred to as a "peak-cutting object portion") that exceeds the standard threshold value that is the standard for judging the presence of the peak-cutting process in total future demand curves, and then selects regulating batteries from among the relevant batteries.

Instruction control unit 7f can also typically be referred to as control means.

When there is a plurality of regulating batteries, instruction control unit 7f supplies operation instructions that instruct charging or discharging from communication unit 7a to the plurality of regulating batteries. When there is one regulating battery, instruction control unit 7f supplies an operation instruction from communication unit 7a to the single regulating battery.

Display unit 7g can also typically be referred to as display means.

Display unit 7g executes a variety of displays. For example, display unit 7g displays the collection results of information collection units 7b1 and 7b2 within state management unit 7e1. Display unit 7g further displays the battery characteristics range and communication characteristics range that are used for selecting relevant batteries (candidates of regulating batteries), relevant batteries that were selected using the battery characteristics range and communication characteristics range, and the regulating batteries that were selected from among the relevant batteries.

The operation is next described.

A peak-cutting process that uses ES 6a that is a consumer-side battery is next described.

The operations of information collection units 7b1 and 7b2 and the operation of selecting relevant batteries is first described.

Figure 3:
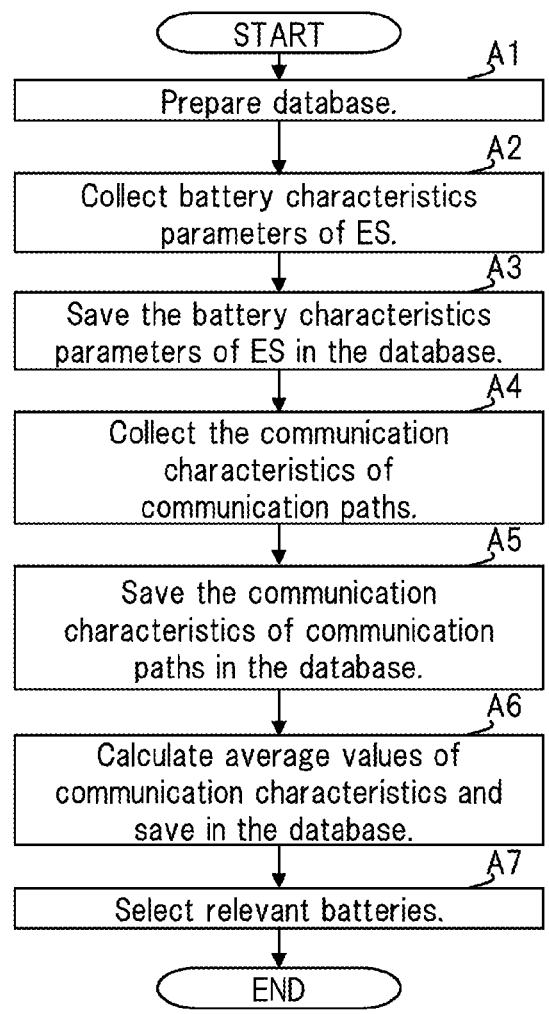
FIG. 3 is a flow chart for describing the operations of information collection unit 7b1 and 7b2 and the operation of selecting batteries.

FIG. 3 is a flow chart for describing the operations of information collection units 7b1 and 7b2 and the operation of selecting relevant batteries.

In DEMS 7, state management unit 7e1 prepares a database for saving each of the collection results of information collection units 7b1 and 7b2 (Step A1).

Information collection unit 7b1 next collects the battery characteristics parameters of each ES 5a and each ES 6a together with the IDs of each ES 5a and each ES 6a by way of communication network 8 (Step A2).

In Step A2, information collection unit 7b1 transmits characteristics requests from communication unit 7a to supply-side battery system 5 and consumer-side battery systems 61-6m and then receives by way of communication unit 7a the battery characteristics parameters and IDs of each ES 5a and each ES 6a that are transmitted from supply-side battery system 5 and consumer-side battery systems 61-6m in response to the characteristics requests.

Each parameters that is collected at this time is each characteristics of each ES that is recognized by each BMU that each ES 5a or each ES 6a possesses or that is recognized by battery control devices 51 or 61. In the present exemplary embodiment, the following characteristics are collected:
 (a-1) the residual capacity,
 (a-2) the SOC,
 (a-3) the maximum charge/discharge output, and
 (a-4) the maximum continuous charge/discharge time.

Information collection unit 7b1 next saves the result of collection of battery characteristics parameters of each ES 5a and each ES 6a in the database in state management unit 7e1 (Step A3).

In addition, based on the communication results relating to the transmission of the characteristics requests and the reception of battery characteristics parameters carried out by information collection unit 7b1, information collection unit 7b2 collects the following, as the communication characteristics of the communication paths used by each ES 5a and each ES 6a:
 (b-1) the communication delay time,
 (b-2) the PER, and
 (b-3) the BER.
(Step A4)

Information collection unit 7b2 then additionally saves the communication characteristics of the communication paths used by each ES 5*a* and each ES 6*a* in the database in state management unit 7*e*1 (Step A5).

When the communication characteristics of the communication paths used by each ES 5*a* and each ES 6*a* have been saved in the database, state management unit 7*e*1 calculates the following for each ES 5*a* and for each ES 6*a*:

(b-11) the average value of the communication delay times, (b-21) the average value of PER, and (b-31) the average value of BER, and also saves these calculation results in its own database (Step A6).

Battery selection unit 7*e*2 then refers to the database in state management unit 7*e*1 and selects from among each ES 6*a* candidates of regulating batteries (relevant batteries) for use in the peak-cutting process (Step A7).

For example, in Step A7, battery selection unit 7*e*2 selects, as relevant batteries, ESs 6*a* that use communication paths for which the average value of (b-21) PER is equal to or less than $1.0 \times 10^{-3}$, and moreover, for which the average value of (b-31) BER is equal to or less than $1.0 \times 10^{-6}$.

In this case, the range in which the average value of (b-21) PER is no greater than $1.0 \times 10^{-3}$, and moreover, the range in which the average value of (b-31) BER is no greater than $1.0 \times 10^{-6}$ is the communication characteristics range that is used for selecting relevant batteries. The communication characteristics range is not limited to the range described above and can be altered as appropriate. For example, a range in which the most recent (b-2) PER is no greater than $1.0 \times 10^{-3}$, and moreover, in which the most recent (b-3) BER is no greater than $1.0 \times 10^{-6}$ may also be used as the communication characteristics range.

The operation in which DEMS 7 judges the necessity of the peak-cutting process is next described.

Figure 4:
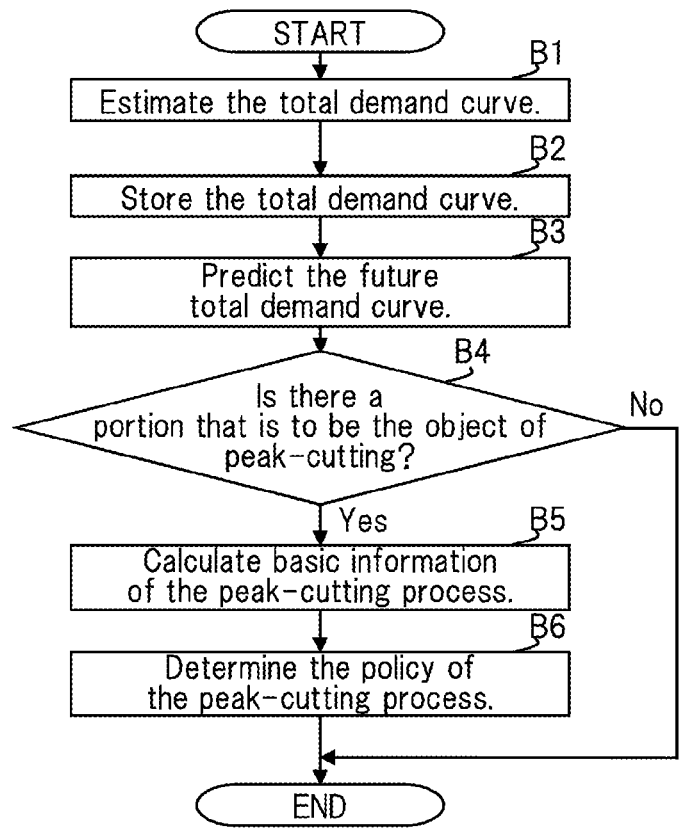
FIG. 4 is a flow chart for describing the operation of judging the necessity of the peak-cutting process.

FIG. 4 is a flow chart for describing the operation of judging the necessity of a peak-cutting process.

System state measurement unit 7*d*, upon estimating the total demand curve (Step B1), supplies the total demand curve to battery selection unit 7*e*2.

Battery selection unit 7*e*2, having received the total demand curve, stores the total demand curve (Step B2).

At a predetermined time (for example, at 00:00 am), battery selection unit 7*e*2 next predicts the total demand curve of the coming day based on the total demand curve in battery selection unit 7*e*2, i.e., the total past demand curve (Step B3). The predetermined time is not limited to 00:00 am and can be altered as appropriate. In addition, of the total past demand curves, the total demand curve of a day that is the same day of the week and the same month as the day that is to be predicted is used as the total past demand curve that is used when predicting the total demand curve of the coming day. The total past demand curve that is used when predicting the total demand curve of the coming day is not limited to the total demand curve described above and can be altered as appropriate.

Battery selection unit 7*e*2 next judges whether a peak-cutting object portion is present in the total demand curve of the coming day that was predicted (hereinbelow referred to as the "predicted total demand curve") (Step B4).

When there is no peak-cutting object portion in the predicted total demand curve, battery selection unit 7*e*2 judges that the peak-cutting process is not necessary and ends the process shown in FIG. 4.

However, if a peak-cutting object portion is present in the predicted total demand curve, battery selection unit 7*e*2 judges that a peak-cutting process is necessary, and based on the peak-cutting object portion, calculates basic information relating to the peak-cutting process (hereinbelow referred to as simply "basic information") (Step B5). The basic information includes the starting time of the peak-cutting process, the continuous time of the peak-cutting process, and the power required for carrying out the peak-cutting process (hereinbelow referred to as "peak-cutting amount").

Battery selection unit 7*e*2 next determines the policy of the peak-cutting process based on the basic information and the battery characteristics of ES 5*a* (the supply-side batteries) that are saved in the database of state management unit 7*e*1 (Step B6).

For the sake of simplification in the following explanation, explanation will proceed on the assumption that in Step B5, battery selection unit 7*e*2 calculates 13:00 pm as the starting time of the peak-cutting process, calculates the 8 hours from 13:00 to 21:00 as the continuous time interval of the peak-cutting process, and calculates, as the peak-cutting amount, the average of 1 MW in the hour interval from 13:00 to 14:00, the average of 3 MW in the five hours from 14:00 to 19:00, and the average of 1 MW in the two hours from 19:00 to 21:00.

The breakdown by hour of the peak-cutting amount in the five-hour interval from 14:00 to 19:00 is assumed to be: the average of 3.9 MW in the hour from 14:00 to 15:00, the average of 3.4 MW in the hour from 15:00 to 16:00, the average of 3.2 MW in the hour from 16:00 to 17:00, the average of 2.6 MW in the hour from 17:00 to 18:00, and the average of 1.9 MW in the hour from 18:00 to 19:00.

In addition, ESs 5*a* within the plurality of supply-side battery systems 5 are assumed to have a total of 5 MWh (fully charged state). In the following explanation, ESs 5*a* within the plurality of supply-side battery systems 5 are collectively referred to as "system-side batteries." The maximum charge/discharge output of the system-side batteries is assumed to be 1 MW.

The information that the system-side batteries have 5 MWh in the fully charged state and that the maximum charge/discharge output of the system-side batteries is 1 MW is specified based on, of the battery characteristics parameters (a-1)-(a-4) of each ES 5*a* that have been saved in the database in state management unit 7*e*1, (a-1) the residual capacity, (a-2) the SOC, and (a-3) the maximum charge/discharge output.

In Step B6, battery selection unit 7*e*2 is then assumed to determine, as the peak-cutting policy, to cause the system-side batteries to discharge at the maximum discharge output of 1 MW for a total of three hours from 13:00 to 14:00 and from 19:00 to 21:00, to cause the system-side batteries to discharge at 400 kW for five hours from 14:00 to 19:00, and to cover the peak-cutting amount of 2.6 MW×5 h (time)= 13,000 kWh by means of consumer-side ESs 6*a* for five hours from 14:00 to 19:00 that cannot be covered by the system-side batteries.

As a result, the peak-cutting starting time (hereinbelow referred to as the "battery-side peak-cutting starting time") in the peak-cutting process that is carried out using consumer-side ESs 6*a* (hereinbelow referred to as "peak-cutting process using batteries") is 14:00. In addition, the continuous time interval of the peak-cutting process (hereinbelow referred to as the "battery-side peak-cutting process continuous time") is five hours (h). Still further, the peak-cutting amount is the average of 3500 kW in the hour from 14:00 to 15:00, the average of 3000 kW in the hour from 15:00 to 16:00, the average of 2800 kW in the hour from 16:00 to 17:00, and the average of 1500 kW in the hour from 18:00 to 19:00. As a result, a total of 13000 kWh (the capacity considered necessary in consumer-side ES 6*a*) is necessary in consumer-side ESs 6*a*.

Figure 5:
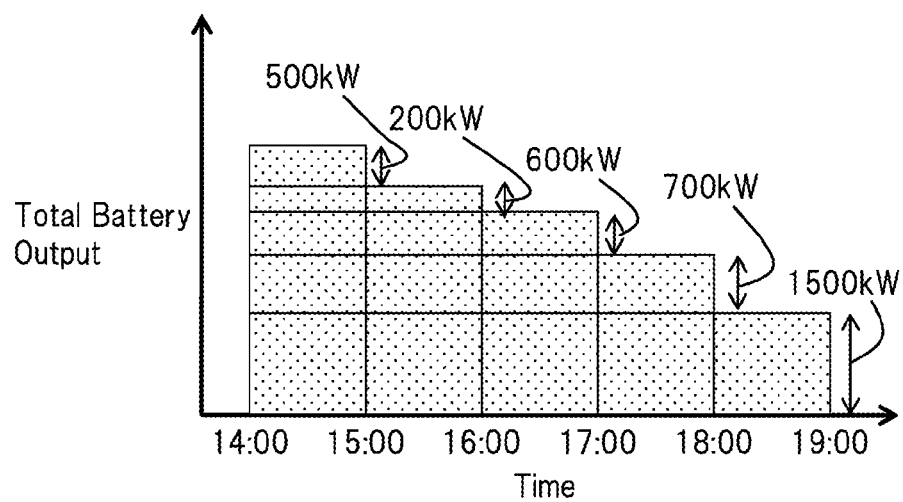
FIG. 5 shows the amount of peak-cutting in a peak-cutting process that uses batteries.

FIG. 5 shows the peak-cutting amount in the peak-cutting process using batteries.

As shown in FIG. 5, in this peak-cutting process that uses batteries, the peak-cutting amount of "1500 kW" in the interval from 18:00 to 19:00 is the smallest amount. In addition, the peak-cutting amount of the interval from 17:00 to 18:00 is "2200 kW" that is obtained by adding "700 kW" to "1500 kW." The peak-cutting amount of the interval from 16:00 to 17:00 is "2800 kW" that is obtained by adding "600 kW" to "2200 kW." The peak-cutting amount of the interval from 15:00 to 16:00 is "3000 kW" that is obtained by adding "200 kW" to "2800 kW." Finally, the peak-cutting amount of the interval from 14:00 to 15:00 is "3500 kW" that is obtained by adding "500 kW" to "3000 kW."

The operation of the peak-cutting process using batteries is next described.

Figure 6:
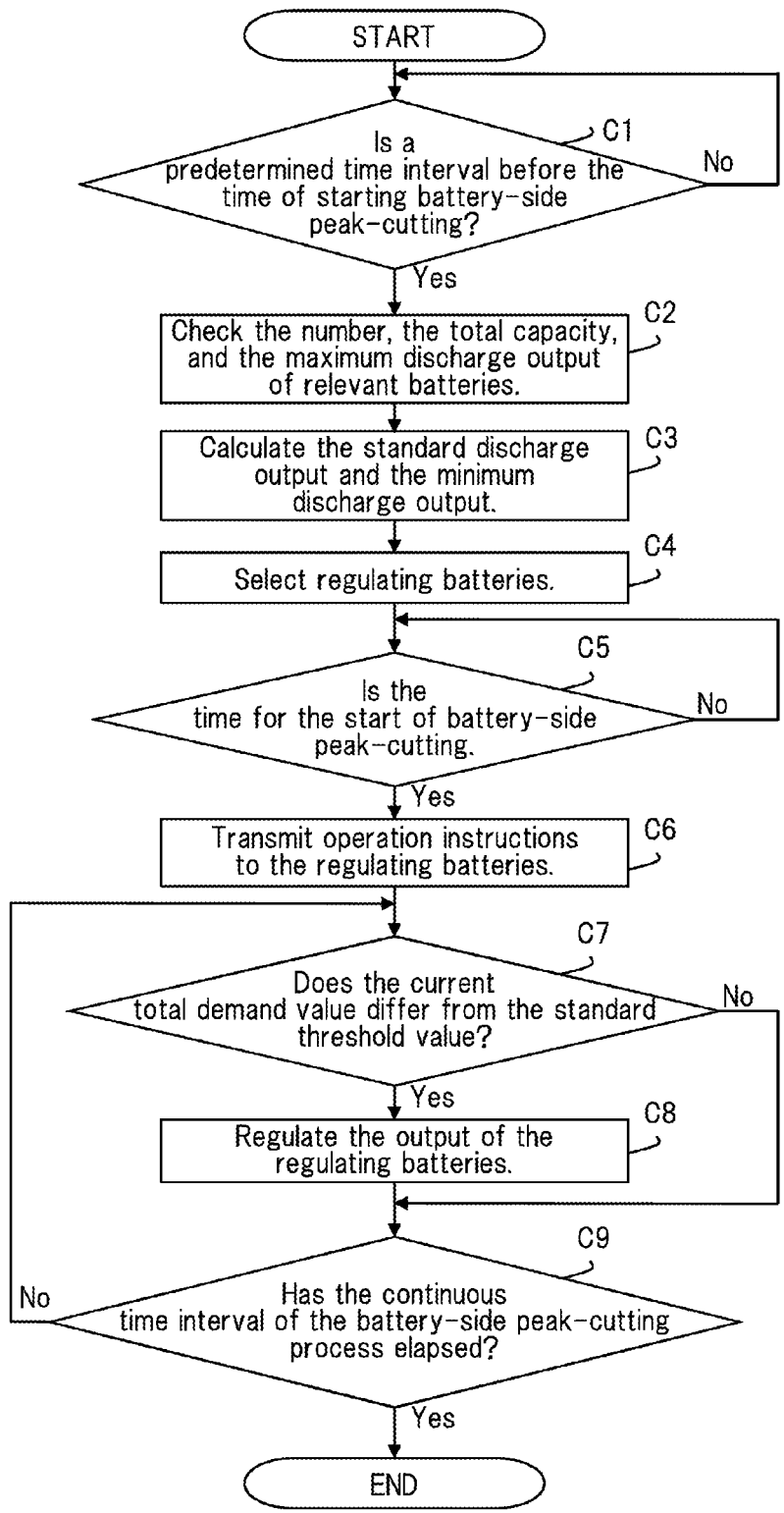
FIG. 6 is a flow chart for describing the operation of the peak-cutting process that uses batteries.

FIG. 6 is a flow chart for describing the operation of the peak-cutting process using batteries.

At a time point that is a predetermined time interval (for example, four minutes) before the battery side peak-cutting starting time (Step C1), battery selection unit 7*e*2 refers to the database in state management unit 7*e*1 to verify the number of relevant batteries, the total capacity of the relevant batteries, and the maximum discharge output of each of the relevant batteries at that time point (Step C2).

In Step C2, battery selection unit 7*e*2 uses, of the battery characteristics parameters (a-1)-(a-4) that are saved in the database in state management unit 7*e*1, (a-1) the residual capacity, and (a-3) the maximum charge/discharge output to verify the total capacity of the relevant batteries and the maximum discharge output of each of the relevant batteries.

In the following explanation, it is assumed that: the number of relevant batteries is 1600, the total capacity of the relevant batteries is 26000 kWh, and the maximum discharge output of each of the relevant batteries is 2 kW.

Battery selection unit 7*e*2 next calculates the standard discharge output and the minimum discharge output (Step C3).

The standard discharge output is a value calculated by (total capacity of the relevant batteries/battery-side peak-cutting process continuous time)/(number of relevant batteries), and is equal to (26000 kWh/5 h)/(1600)=3.25 kW.

The minimum discharge output is a value calculated as (capacity required at ESs 6*a* of the consumer side/battery-side peak-cutting process continuous time)/(number of relevant batteries), and is equal to (13000 kWh/5 h)/(1600)= 1.625 kW.

Battery selection unit 7*e*2 next selects the regulating batteries from among the relevant batteries (Step C4).

In Step C4, battery selection unit 7*e*2 uses integer i and xi to select regulating batteries from among the relevant batteries.

Battery selection unit 7*e*2 first sets xi to equal 1500 kWh (i=1), 700 kWh (i=2), 600 kWh (i=3), 200 kWh (i=4), and 500 kWh (i=5) based on the difference in peak-cutting amount for each hour (refer to FIG. 5), and then loops the selection process shown hereinbelow five times while changing i from 1 to 5 to select regulating batteries.

The $i^{th}$ Selection Process:

(1) Battery selection unit 7*e*2 refers to the database in state management unit 7*e*1 to select, from among relevant batteries that have not been selected as regulating batteries, each ES 6*a* for which the maximum discharge output is at least 2 kW but lower than 3.25 kW and for which the maximum continuous discharge time is at least (6−i) hours as the first screening ES.

Battery selection unit 7*e*2 next sets the discharge output of each first screening ES to "maximum discharge output," continues selecting ESs 6*a* from among each first screening ES until this total discharge output becomes xi, and specifies the selected ESs 6*a* as regulating batteries. In this case, the predetermined conditions are determined by: the condition that the maximum discharge output be at least 2 kW but less than 3.25 kW, the condition that the maximum continuous discharge time be equal to or longer than (6−i) hours, and xi.

Battery selection unit 7*e*2 then sets the discharge time of the regulating batteries to (6−i) hours.

(2) If the total discharge output of regulating batteries does not satisfy xi despite the execution of the process described in (1) above, i.e., if the total discharge output of the first screening ESs does not satisfy xi, battery selection unit 7*e*2 refers to the database in state management unit 7*e*1 and selects, from among relevant batteries that have not been selected as regulating batteries, each ES 6*a* for which the maximum discharge output is at least 2 kW but less than 3.25 kW and for which the maximum continuous discharge time is shorter than (6−i) hours as the second screening ES.

Battery selection unit 7*e*2 then sets the discharge output of each second screening ES to "battery capacity/(6−i)," selects ESs 6*a*, from among each second screening ES, in order from ES 6*a* having longer maximum continuous discharge times, and specifies these selected ESs 6*a* as regulating batteries. Battery selection unit 7*e*2 further carries out the selection of regulating batteries until the total discharge output of regulating batteries (including the regulating batteries selected in (1) described hereinabove) reaches xi. In this case, the conditions that the maximum discharge output be at least 2 kW but less than 3.25 kW and that the maximum continuous discharge time be shorter than (6−i) hours are added to the predetermined conditions. The battery capacity means the residual capacity.

Battery selection unit 7*e*2 then sets the discharge time of the regulating batteries to (6−i) hours.

(3) If the total discharge output of the regulating batteries still does not satisfy xi despite the execution of (2) described above, i.e., if the total discharge output of the first screening ESs and the second screening ESs does not satisfy xi, battery selection unit 7*e*2 refers to the database in state management unit 7*e*1 and selects, from among relevant batteries that have not been selected as regulating batteries, each ESs 6*a* for which the maximum discharge output is at least 3.25 kW and for which the maximum continuous discharge time is shorter than (6−i) hours as the third screening ES.

Battery selection unit 7*e*2 then sets the discharge output of each third screening ES to "the smaller of battery capacity/(6−i) and 3.25 kW," selects in order from among the third screening ESs each ES 6*a* units having shorter maximum continuous discharge times, and specifies these selected ESs 6*a* as regulating batteries. Battery selection unit 7*e*2 carries out the selection of regulating batteries until the total discharge output of the regulating batteries (including the regulating batteries that were selected in (1) described above and regulating batteries selected in (2) described above) reaches xi. In this case, the conditions that the maximum discharge output be at least 3.25 kW and the maximum continuous discharge time be shorter than (6−i) hours are added to the predetermined conditions.

Battery selection unit 7*e*2 then sets the discharge time of the regulating batteries to (6−i) hours.

(4) When the total discharge output of the regulating batteries reaches xi, battery selection unit 7e2 ends the selection of the regulating batteries. If the total discharge output of the regulating batteries does not reach xi despite the execution of the process of (3) described above, i.e., if the total discharge output of the first screening ESs, the second screening ESs, and the third screening ESs does not satisfy xi, battery selection unit 7e2 ends the selection of regulating batteries.

Figure 7:
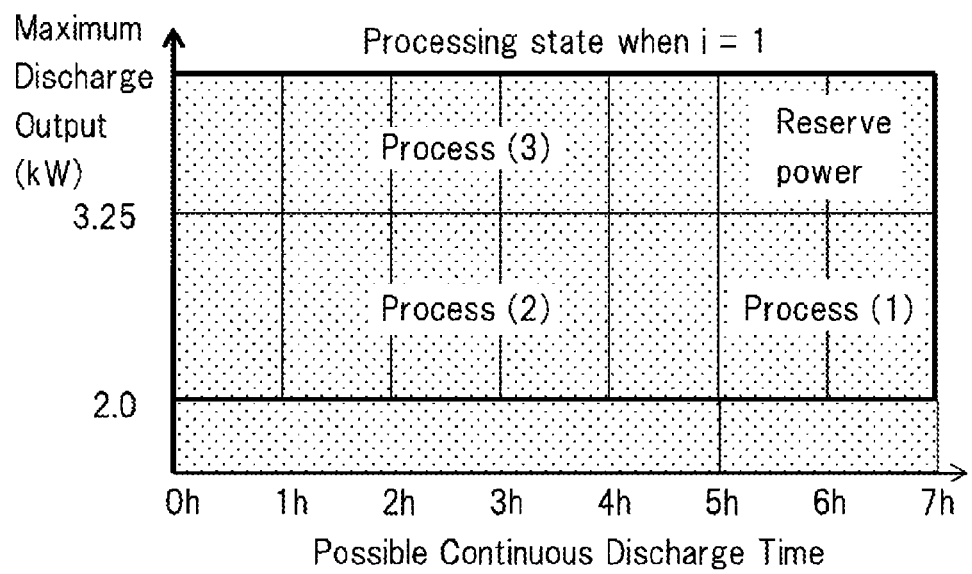
FIG. 7 is a view for describing the selection process when i=1.

FIG. 7 is a view for describing the selection process when i=1.

When i=1, ESs 6a belonging to process (1) of FIG. 7 among relevant batteries that are not selected as regulating batteries in the process (1) described hereinabove are selected as the first screening ESs; ESs 6a belonging to process (2) of FIG. 7 among relevant batteries that are not selected as regulating batteries in process (2) described hereinabove are additionally selected as the second screening ESs; and ESs 6a belonging to process (3) of FIG. 7 among relevant batteries that are not selected as regulating batteries in process (3) described above are selected as the third screening ESs.

Battery selection unit 7e2, having selected regulating batteries, supplies to display unit 7g the communication characteristics range that was used for selecting relevant batteries, the selection results of the relevant batteries, and the selection results of the regulating batteries. Display unit 7g, upon receiving the communication characteristics range, the selection results of the relevant batteries, and the selection results of the regulating batteries, displays the communication characteristics range, the selection results of relevant batteries, and the selection results of regulating batteries.

When the battery-side peak-cutting starting time (in this example, 14:00) arrives (Step C5), battery selection unit 7e2 supplies to instruction control unit 7f result information that shows the selection results of the selection process (the selection results of regulating batteries) and the setting results (the setting results of the discharge output and discharge time of regulating batteries).

Upon receiving the result information, display unit 7f supplies operation instructions indicating that discharge is to be carried out to the regulating batteries that are shown by the result information at the discharge output that is shown in the result information and the discharge time that is shown in the result information (Step C6).

Battery selection unit 7e2 next judges whether the most recent total demand value in the total demand curve that is received at five-second periods from system state measurement unit 7d diverges from the standard threshold value that is used for selecting the peak-cutting object portions (Step C7).

When the total demand value diverges from the standard threshold value, battery selection unit 7e2 regulates the discharge output that is set for regulating batteries and supplies this regulation result to instruction control unit 7f. Instruction control unit 7f, upon receiving the regulation result, supplies operation instructions that accord with this regulation result to the regulating batteries (Step C8).

If the total demand value is lower than the standard threshold value in Step C8, battery selection unit 7e2 judges that the discharge output of the regulating batteries must be made lower than the current output, but if the total demand value is higher than the standard threshold value, battery selection unit 7e2 judges that the discharge output of the regulating batteries must be made higher than the current output.

For example, when battery selection unit 7e2 has judged that the discharge output of the regulating batteries must be made lower than the current state in the interval from 14:00 to 15:00, battery selection unit 7e2 refers to the database in state management unit 7e1 and selects, from among regulating batteries that have been selected in the process of i=5, each battery whose output is to be lowered in order from batteries having shorter (b-1) communication delay time. For example, battery selection unit 7e2 selects each battery whose output is to be lowered until the total sum of the discharge output of the batteries whose output are to be lowered matches the difference between the total demand value and the standard threshold value.

Battery selection unit 7e2 next supplies discharge instructions indicating that the discharge output is to be made "0" and the results of selecting batteries whose output are to be lowered, to instruction control unit 7f as the regulation results.

Upon receiving the discharge instruction indicating that the discharge output is to be made "0" and the results of selecting batteries whose output are to be lowered, instruction control unit 7f supplies operation instructions, indicating that discharge output is to be made "0", to the batteries whose output are to be lowered.

Figure 8:
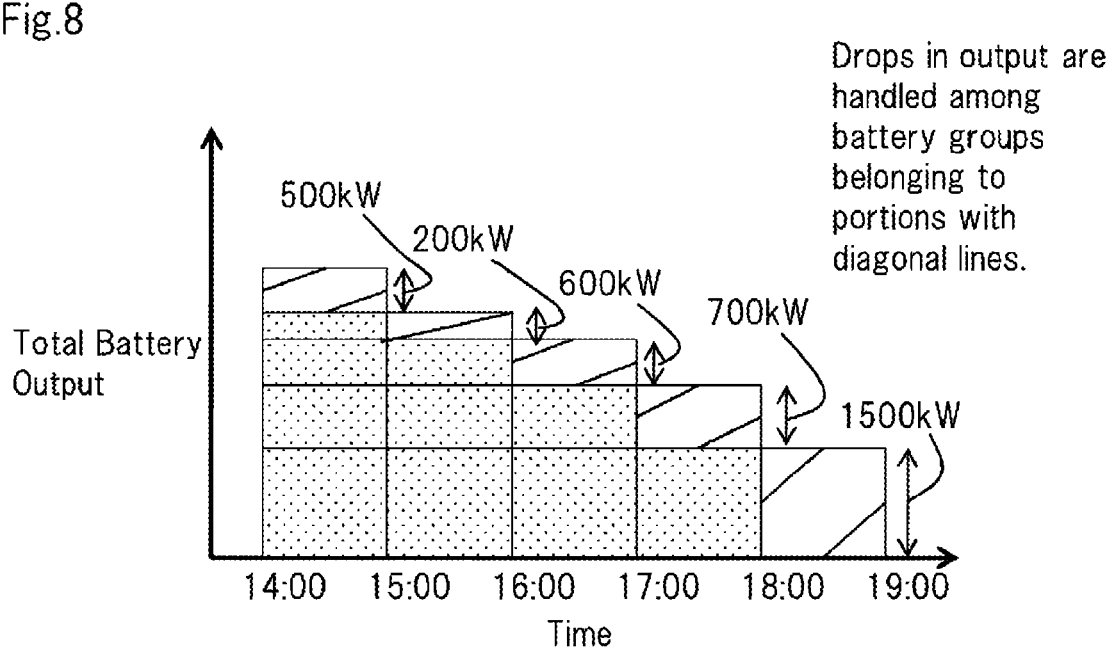
FIG. 8 shows an example of regulating batteries that are the object of selection of batteries for decreasing output.

FIG. 8 shows an example of the regulating batteries that are the objects of selection of batteries whose output are to be lowered.

In FIG. 8, when the time of judging that the discharge output of the regulating batteries must be made lower than the current state (hereinbelow referred to as "the judgment time") is within the time interval of 14:00 to 15:00, the regulating batteries that were selected in the process of i=5 become the selection objects of batteries whose output are to be lowered. In addition, when the judgment time is in the time interval of 15:00 to 16:00, the regulating batteries that were selected in the process of i=4 become the objects of selection of batteries whose output are to be lowered. When the judgment time is in the time interval of 16:00 to 17:00, the regulating batteries that were selected in the process of i=3 become the objects of selection of batteries whose output are to be lowered. When the judgment time is in the time interval of from 17:00 to 18:00, the regulating batteries that were selected in the process of i=2 become the objects of selection of batteries whose output are to be lowered. Finally, when the judgment time is in the time interval of from 18:00 to 19:00, the regulating batteries that were selected in the process of i=1 become the objects of selection of batteries whose output are to be lowered.

For example, when battery selection unit 7e2 judges that the discharge output of regulating batteries must be made higher than the current state in the time interval from 14:00 to 15:00, battery selection unit 7e2 refers to the database in state management unit 7e1 and selects, from among the regulating batteries that were selected in the process of i=5, batteries having a margin for increasing discharge output as batteries whose output are to be boosted. For example, battery selection unit 7e2 selects batteries whose output are to be boosted until the total sum of the margin for boosting discharge output in the selected batteries whose output are to be boosted matches the difference between the total demand value and the standard threshold value.

Battery selection unit 7e2 then supplies discharge instructions indicating that the discharge output is to be made the maximum discharge output and the results of selecting batteries whose output are to be boosted as the regulation result to instruction control unit 7f.

Instruction control unit 7f, having received the discharge instructions indicating that the discharge output is to be made the maximum discharge output and the selection results of batteries whose output are to be boosted, supplies operation instructions indicating that the discharge output is to be made the maximum discharge output to the batteries whose output are to be boosted.

If the total sum of the margin for boosting discharge output in the batteries whose output are to be boosted does not satisfy the difference between the total demand value and the standard threshold value, battery selection unit 7e2 selects new regulating batteries in the order of shorter (b-1) communication delay times from among relevant batteries that have not been selected as regulating batteries. Battery selection unit 7e2 selects new regulating batteries until the total sum of the maximum discharge output of new regulating batteries matches the difference between the total demand value and the standard threshold value. Battery selection unit 7e2 then supplies a discharge instruction indicating that the discharge output is to be made the maximum discharge output and selection results of the new regulating batteries to instruction control unit 7f.

Upon receiving the discharge instruction indicating that the discharge output is to be made the maximum discharge output and the selection results of new regulating batteries, instruction control unit 7f supplies operation instructions indicating that the discharge output is to be made the maximum discharge output to the new regulating batteries.

Battery selection unit 7e2 and instruction control unit 7f then execute the operations that follow Step C7 until the battery-side peak-cutting process continuous time has elapsed (Step C9).

When the battery-side peak-cutting process continuous time from the start of the battery-side peak-cutting process has elapsed (Step C9), the battery-side peak-cutting process ends. When new regulating batteries are being selected to cancel the difference between the total demand value and the standard threshold value, instruction control unit 7f supplies operation halt instructions to the new regulating batteries.

In the present exemplary embodiment described above, DEMS 7 separately controls ES 5a and ES 6a in the peak-cutting process, but DEMS 7 may also control ES 5a similarly to ES 6a in the peak-cutting process.

Figure 9:
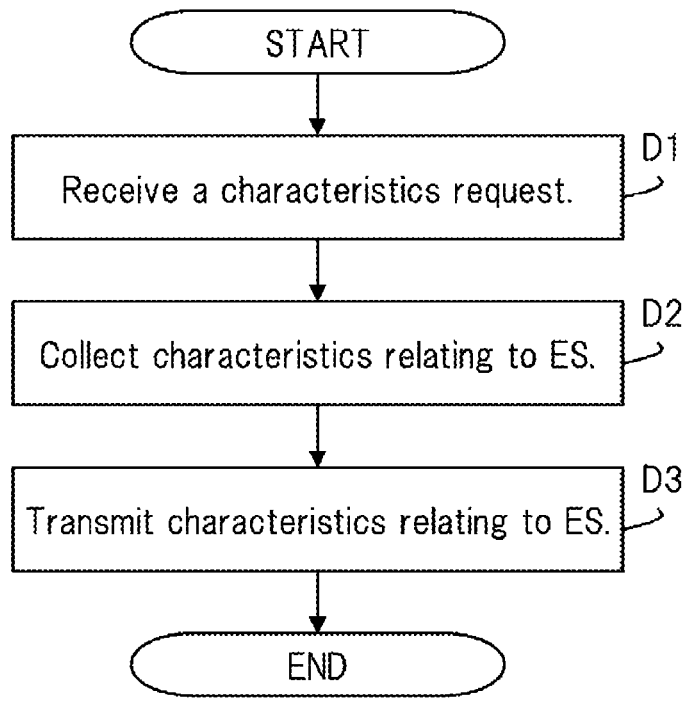
FIG. 9 is a flow chart for describing the operations of supply-side battery system 5 when a characteristics request is received from DEMS 7.

FIG. 9 is a flow chart for describing the operation of supply-side battery system 5 when a characteristics request is received from DEMS 7.

Upon receiving a characteristics request (Step D1), communication terminal 5d supplies a characteristics request to ES control device 5e.

ES control device 5e, having received the characteristics request, collects characteristics relating to ES 5a from BMU 5a2 in ES 5a by way of PCS 5b (Step D2).

In the present exemplary embodiment:
(a-1) the residual capacity of ES,
(a-2) the SOC,
(a-3) the maximum charge/discharge output, and
(a-4) the maximum continuous charge/discharge time
are used as the characteristics relating to ES 5a.

ES control device 5e, having collected the characteristics of ES 5a, transmits the characteristics of ES 5a to DEMS 7 from communication terminal 5d (Step D3).

The operations of consumer-side battery systems 61-6m upon receipt of characteristics requests from DEMS 7 conform to the operations of supply-side battery system 5 upon receipt of a characteristics request from DEMS 7 and redundant explanation is therefore here omitted.

Figure 10:
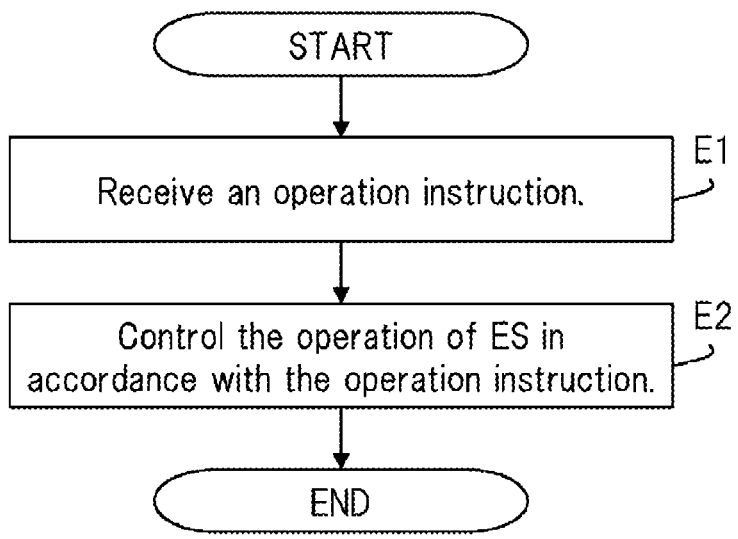
FIG. 10 is a flow chart for describing the operations of supply-side battery system 5 when an operation instruction is received from DEMS 7.

FIG. 10 is a flow chart for describing the operation of supply-side battery system 5 upon receipt of an operation instruction from DEMS 7.

Communication terminal 5d, having received the operation instruction (Step E1), supplies the operation instruction to ES control device 5e.

ES control device 5e controls the operation of ES 5a in accordance with the operation instruction (Step E2).

In the present exemplary embodiment, upon receiving an operation instruction in which discharge output and discharge time are indicated in Step E2, ES control device 5e supplies discharge instructions indicating that discharge is to be executed at that discharge output and for that continuous discharge time to PCS 5b and BMU 5a2 in ES 5a. PCS 5b and BMU 5a2 execute the discharge operation in battery main unit 5a1 in accordance with the discharge instructions.

The operations of consumer-side battery systems 61-6m that have received the operation instructions from DEMS 7 conform to the operation of supply-side battery system 5 that received the operation instruction from DEMS 7, and redundant explanation is therefore here omitted.

Figure 11:
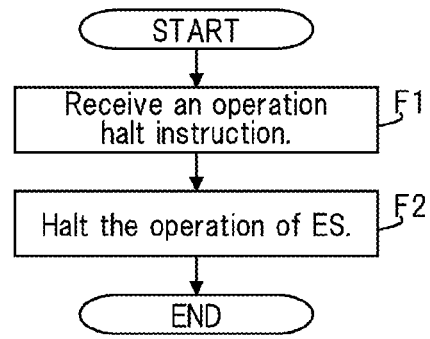
FIG. 11 is a flow chart for describing the operation of supply-side battery system 5 when an operation halt instruction is received from DEMS 7.

FIG. 11 is a flow chart for describing the operation of supply-side battery system 5 that has received an operation halt instruction from DEMS 7.

Communication terminal 5d, having received an operation halt instruction (Step F1), supplies the operation halt instruction to ES control device 5e.

ES control device 5e suspends the operation of ES 5a in accordance with the operation halt instruction (Step F1).

In the present exemplary embodiment, ES control device 5e supplies the operation halt instruction to PCS 5b or BMU 5a2 in ES 5a in Step F1. PCS 5b or BMU 5a2 suspends the operation in battery main unit 5a1 in accordance with the operation halt instruction.

The operations of consumer-side battery systems 61-6m upon receipt of operation halt instructions from DEMS 7 conform to the operations of supply-side battery system 5 upon receipt of an operation halt instruction from DEMS 7, and redundant explanation is therefore here omitted.

The effects of the present exemplary embodiment are next described.

According to the present exemplary embodiment, information collection unit 7b2 detects, for each ES 6a, the characteristics of the communication paths between ES 6a and DEMS 7 within communication network 8. Based on the detection results of information collection unit 7b2, selection unit 7e selects, from among each ES 6a, ESs 6a that use communication paths having characteristics within a predetermined communication characteristics range as candidates for regulating batteries (relevant batteries), and then, based on predetermined conditions, selects regulating batteries from among the candidates of regulating batteries. Instruction control unit 7f supplies operation instructions indicating discharge to the regulating batteries.

As a result, regulating batteries that are used for regulating the electric power of an electric power system are batteries that use communication paths having similar communication characteristics, whereby variations in the characteristics of the communication paths that the regulating batteries are using can be reduced. Accordingly, variations in the reception conditions of operation instructions that result from variations in the characteristics of the communication paths being used by the regulating batteries can also be suppressed, whereby degradation of the precision of the regulation of power supply and demand can be suppressed. In addition, because the plurality of regulating batteries make up a group in which the characteristics of the communication paths are similar, the plurality of regulating batteries can be treated as virtually a single battery (battery cluster).

The effects described above are exhibited by a battery control system composed of information collection unit 7b2, selection unit 7e, and instruction control unit 7f.

Figure 12:
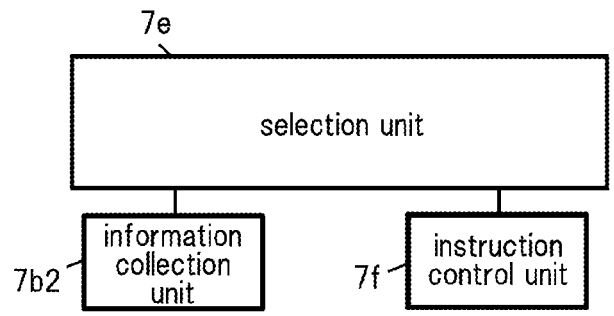
FIG. 12 shows a battery control system that is composed of information collection unit 7b2, selection unit 7e, and instruction control unit 7f.
Figure 13:
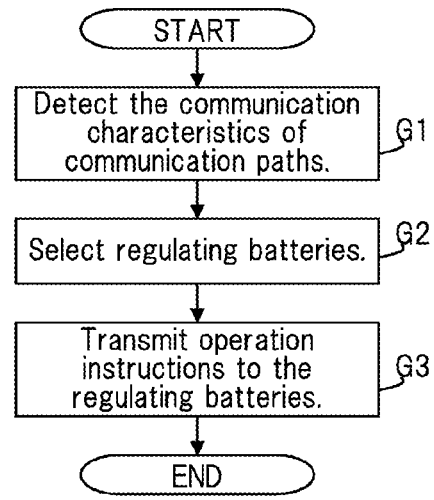
FIG. 13 is a flow chart for describing the operations of the battery control system shown in FIG. 12.

FIG. 12 shows a battery control system that is made up of information collection unit 7b2, selection unit 7e, and instruction control unit 7f. FIG. 13 is a flow chart for describing the operations of the battery control system shown in FIG. 12.

In the battery control system shown in FIG. 12, information collection unit 7b2 first detects, for each ES 6a, the characteristics of the communication paths between ES 6a and DEMS 7 within communication network 8 (Step G1). Selection unit 7e next, based on the detection results of information collection unit 7b2, selects, from among each ES 6a, ESs 6a units that use communication paths having characteristics within a predetermined communication characteristics range as candidates of regulating batteries (relevant batteries), and then, based on predetermined conditions, selects regulating batteries from among the candidates of regulating batteries (Step G2). Instruction control unit 7f next supplies operation instructions to the regulating batteries that instruct discharge (Step G3). In this case, information collection unit 7b2 transmits response requests (inspection information) indicating that a response is requested to, for example, batteries in each ES 5a and each ES 6a, receives responses (predetermined information) corresponding to the response requests, collects the time intervals obtained by dividing by two the time intervals from transmitting the response requests until the reception of the responses for each battery in each ES 5a and in each ES 6a as the communication delay times on the communication paths that the batteries use, and collects the PER or BER for the responses as the PER or BER on the communication paths that the batteries use.

Information collection unit 7b2 may detect as the characteristics of a communication path at least one of: the communication delay time on the communication path, the packet error rate (PER) on the communication path, and the bit error rate (BER) on the communication path; and further, the predetermined communication characteristics range may stipulate the range of at least one of the characteristics detected in information collection unit 7b2.

For example, when the communication delay time that is used on a communication path is used as the characteristic of the communication path and the communication characteristics range stipulates a range of communication delay times, shorter communication delay times that are stipulated by the communication characteristics range result in ES being selected as relevant batteries that use communication paths having shorter communication time with DEMS 7, whereby high-speed response relating to power supply and demand control becomes possible.

In the present exemplary embodiment, display unit 7g displays the communication characteristics range that is used for selecting relevant batteries (candidates of regulating batteries), the selection results of relevant batteries, and the selection results of regulating batteries. As a result, the user of the battery control system is able to check the operating state of the battery control system (the selection results of relevant batteries and selection results of regulating batteries). As a result, the user of the battery control system is able to correct the communication characteristics ranges to adjust the selection results of relevant batteries or the selection results of regulating batteries when the selection results of relevant batteries or the selection results of regulating batteries diverge from the intended results.

In battery control device 61 of the present exemplary embodiment, when communication terminal 6d receives a characteristics request (inspection information), ES control device 6e transmits the battery characteristics parameters (predetermined information) of ES 6a from communication terminal 6d to the transmission origin of the characteristics request, and when communication terminal 6d receives an operation instruction, ES control device 6e controls ES 6a based on the operation instruction. As a result, ES control device 6e is able to control the operations of ES 6a in accordance with the control of DEMS 7.

In the exemplary embodiment described hereinabove, consumer-side ESs 6a were caused to be discharged in order to cut, of the predicted total demand curve, peaks that surpass the standard threshold value, but charging of consumer-side ESs 6a may be executed in order to cut peaks of the predicted total demand curve that are lower than the standard threshold value or peaks that are lower than a predetermined threshold value that is lower than the standard threshold value. In this case, DEMS 7 must recognize the chargeable capacity of relevant batteries. As a result, (a-5) the residual space capacity of ES is added as a battery characteristic parameter.

In the above-described exemplary embodiment, the BMU in ES recognizes the maximum continuous charge/discharge time and transmit the maximum continuous charge/discharge time to DEMS 7, but as an example, information collection unit 7b in DEMS 7 may also divide the residual capacity of ES by the ES charge/discharge output for each ES to calculate the maximum continuous charge/discharge time. In this case, BMU in ES need not recognize the maximum continuous charge/discharge time.

In the exemplary embodiment described hereinabove, DEMS 7 constantly and dynamically recognizes the battery characteristics and communication path characteristics and is therefore able to recognize in real time an ES group that is capable of operation in the event of an emergency and is able to realize charge/discharge control according to an objective.

In the exemplary embodiment described hereinabove, information collection unit 7b2 collects (b-1) communication delay time, (b-2) PER, and (b-3) BER as the communication characteristics of communication paths, but the communication characteristics of communication paths that are collected are not limited to these characteristics, can be altered as appropriate, and may be any one of the above-described characteristics or more than one of the above-described characteristics.

For example, information collection unit 7b2 may collect as the communication characteristics of communication paths the MTTF (Mean Time to Failure), the MTU (Maximum Transmission Unit) value, or the communication throughput.

MTU is a value that indicates the maximum value of data that can be transmitted by one transfer of a particular link in the communication network. Typically, in the case of a stabilized communication environment, throughput increases as the MTU value increases. In the case of an unstable communication environment, however, the number of wasteful retransmissions increases, and throughput improves with smaller MTU values. As a result, when the MTU value is used as the information for stipulating the communication characteristics range, the communication characteristics range is stipulated by combining the MTU value with PER or BER.

Second Exemplary Embodiment

Regarding the regulation of power supply and demand of an electric power system (i.e., control of the frequency of electric power), regions and control techniques can typically be organized in the order of shorter response time (in the order of the need for high-speed response).

(A) Inertial Force Region of a Generator (Synchronizer)

In the inertial force region of a generator (synchronizer) in which the response time is shortest, the compensation for fluctuations in electric power demand is carried out to follow the fluctuation in electric power demand by releasing or absorbing the inertial force of the generator with respect to fluctuation in the electric power demand (=(M×(df/dt)) that is prescribed by the inertia constant (M) and the acceleration of the generator rotator (df/dt)). Under this control, the frequency of the electric power continuously changes linearly to compensate for unbalance of the electric power supply and demand.

(B) Governor Region

In the governor region which is next shortest, in order to suppress the changes in frequency of (A) described above by means of governor-free operation, output control of the generator is carried out according to the frequency deviation of the electric power, and frequency control (frequency stabilization) and follow-up control that follow electric power demand are carried out. As a result of this control, the electric power frequency settles to a particular value.

(C) LFC (Load Frequency Control) Region

Then, in the LFC region, speed changer control (control of the amount of generation) in the generator is carried out with the amount of Area Requirement power as a target, and frequency control (feedback control to the reference frequency) and follow-up control that follow electric power demand are carried out.

The battery control system of the second exemplary embodiment uses ESs 5a and ESs 6a to regulate electric power supply and demand in the LFC region.

Figure 14:
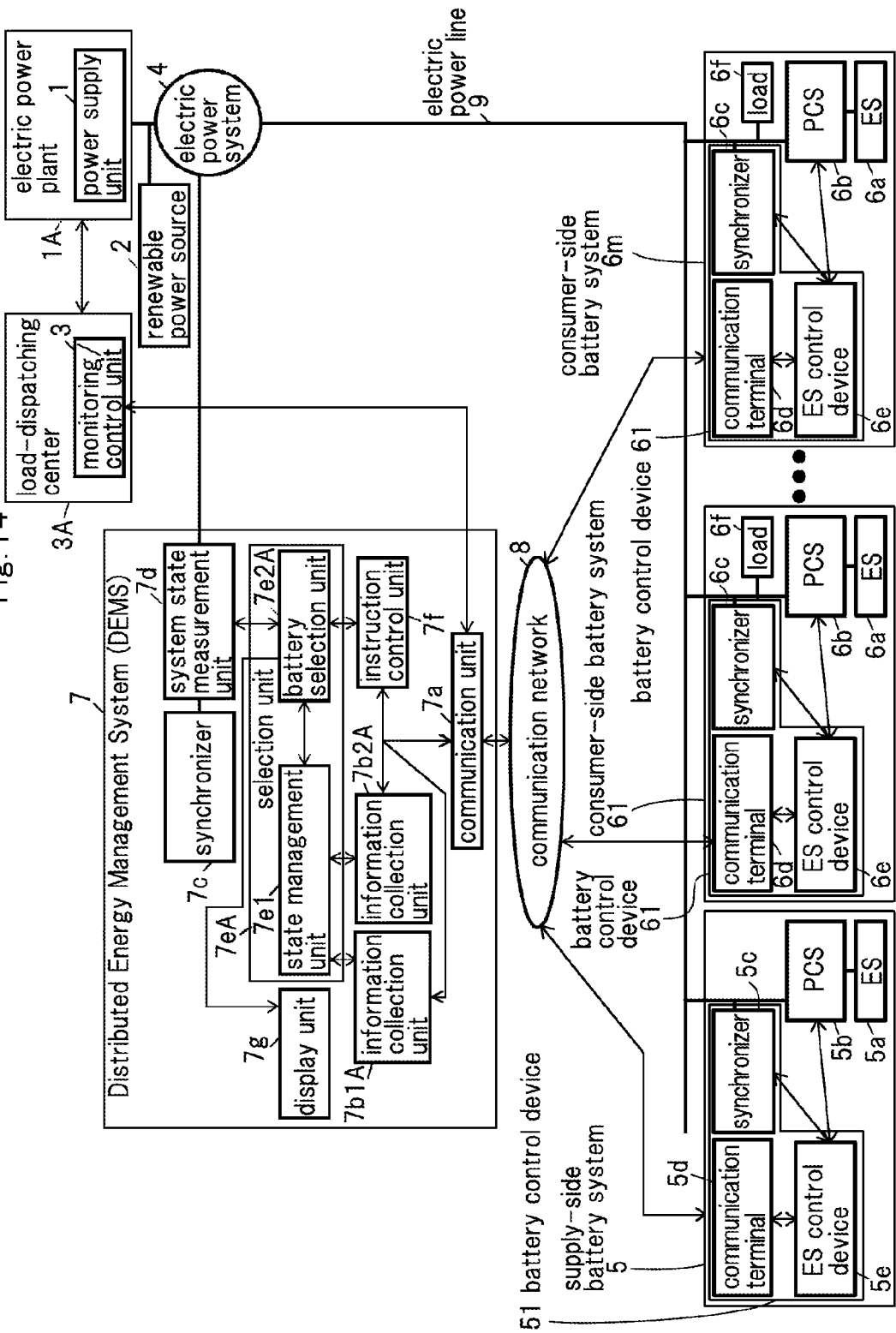
FIG. 14 shows a power control system that adopts the battery control system of the second exemplary embodiment of the present invention.

FIG. 14 shows an electric power control system that adopts the battery control system of the second exemplary embodiment of the present invention. In FIG. 14, constructions that are identical to constructions shown in FIG. 1 are given the same reference numbers. The electric power control system shown in FIG. 14 is next described with focus upon those points that differ from the electric power control system shown in FIG. 1.

In the electric power control system shown in FIG. 14, each of battery control devices 51 and 61 or each BMU belonging to each ES 5a and each ES 6a recognizes, as the characteristics of ES:

(a-1) the residual capacity,
(a-2) the SOC,
(a-3) the maximum charge/discharge output,
(a-5) the residual space capacity,
(a-6) the V permissible value (the permissible value up to the voltage maximum-minimum of the connection point of ES),
(a-7) the in-device response time in ES (the time required from reception of an execution instruction by an ES until the start of the operation that accords with the execution instruction), and
(a-8) the continuous charge/discharge time at a predetermined output.

In the present exemplary embodiment, the continuous discharge/charge time at 2 kW (the predetermined output) is used as (a-8) the continuous charge/discharge time at a predetermined output. In addition, (a-8) the continuous charge/discharge time at a predetermined output is not limited to the continuous charge/discharge time at 2 kW, and a continuous charge/discharge time at output that differs from 2 kW may be used.

In the electric power control system shown in FIG. 14, information collection unit 7b1A is used in place of information collection unit 7b1 in the first exemplary embodiment shown in FIG. 1, information collection unit 7b2A is used in place of information collection unit 7b2, selection unit 7eA is used in place of selection unit 7e, and battery selection unit 7e2A is used in place of battery selection unit 7e2.

Information collection unit 7b1A collects from ESs 5a and each of ESs 6a IDs and the battery characteristics parameters that represent each of (a-1) the residual capacity, (a-2) the SOC, (a-3) the maximum charge/discharge output, (a-5) the residual space capacity, (a-6) the V permissible value, (a-7) the in-device response time, and (a-8) the continuous charge/discharge time at 2 kW. In the present exemplary embodiment, information collection unit 7b1A collects IDs and battery characteristics parameters at a prescribed time intervals (three-second intervals). The prescribed time intervals are not limited to three-second intervals and can be altered as appropriate.

Information collection unit 7b2A collects (b-1) the communication delay times as the characteristics of the communication paths at prescribed time intervals.

Battery selection unit 7e2A uses the battery characteristics range that is used for selecting candidates of regulating batteries (hereinbelow referred to as "battery characteristics range") and the communication characteristics range, and based on each of the collection results of information collection unit 7b1A and information collection unit 7b2A, selects, from among each ES 5a and each ES 6a, ESs (batteries) that use communication paths having characteristics within the communication characteristics range and that have characteristics within the battery characteristics range as relevant batteries. The battery characteristics range that is used for selecting candidates of regulating batteries is an example of the predetermined battery characteristics range. Battery selection unit 7e2A then selects regulating batteries from among the relevant batteries.

The operation of battery selection unit 7e2A is next described.

The operation in which battery selection unit 7e2A transmits to load-dispatching center 3A information relating to ESs that can be applied to LFC is first described.

Figure 15:
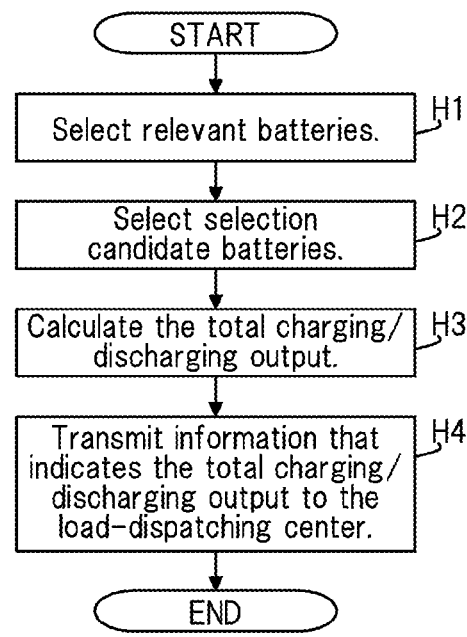
FIG. 15 is a flow chart for describing the operation of battery selection unit 7e2A for transmitting to load-dispatching center 3A information relating to ES that can be applied to LFC.

FIG. 15 is a flow chart for describing the operation in which battery selection unit 7e2A transmits to load-dispatching center 3A information relating to ESs that can be applied to LFC.

In the present exemplary embodiment, based on each of the collection results of information collection unit 7b1A and 7b2A that are saved in the database in state management unit 7e1 at prescribed time intervals, battery selection unit 7e2A selects as relevant batteries from among each ES 5a and each ES 6a ESs for which: the SOC is 50%±5%, the V permissible value is at least 80%, the communication delay time of the communication path is no more than 2 seconds, the in-device response time is no greater than 2 seconds, and moreover, the charge/discharge time at 2 kW is at least 60 minutes (Step H1).

In this case, the communication characteristics range is a range in which the communication delay time of a communication path is no greater than 2 seconds. In addition, the batteries characteristics range is the range in which the SOC is 50%±5%, the V permissible value is at least 80%, the in-device response time is no greater than 2 seconds, and moreover, the charge/discharge time at 2 kW is at least 60 minutes. The communication characteristics range and battery characteristics range are not limited to the ranges described hereinabove and can be altered as appropriate.

Battery selection unit 7e2A next selects from among the relevant batteries ESs for which the time duration obtained by adding the communication delay time of the communication path to the in-device response time (hereinbelow referred to as the "charge/discharge delay time") is no greater than 2 seconds as selection candidate batteries (Step H2).

Next, based on the maximum charge/discharge output of the selection candidate batteries, battery selection unit 7e2A calculates the total charge/discharge output of the selection candidate batteries (Step H3).

Battery selection unit 7e2A then transmits information indicating the total charge/discharge output of the selection candidate batteries to load-dispatching center 3A (for example monitoring/control unit 3) by way of communication unit 7a (Step H4).

The control operation of ESs in the LFC region is next described.

Figure 16:
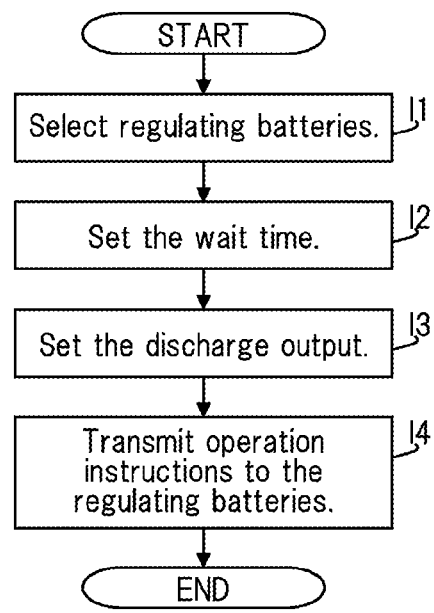
FIG. 16 is a flow chart for describing the control operation of ES in the LFC region.

FIG. 16 is a flow chart for describing the control operation of ESs in the LFC region.

In the following explanation, the number of selection candidate batteries is assumed to be 1500, and the total discharge output of the selection candidate batteries is assumed to be 3 MW.

Under these conditions, when battery selection unit 7e2A receives a "1-MW supply LFC command" (i.e., a command to use 1 MW as the total discharge output of the regulating batteries) from load-dispatching center 3A (for example monitoring/control unit 3), battery selection unit 7e2A operates as shown below.

Battery selection unit 7e2A selects, from among the selection candidate batteries, regulating batteries while giving priority to batteries having longer discharge times at 2 kW. At this time, battery selection unit 7e2A selects regulating batteries until the number of regulating batteries reaches 500 (Step I1).

Battery selection unit 7e2A next carries out an arithmetic operation of subtracting, for each regulating battery, the charge/discharge delay time from 2 seconds, which is the reference time from a predetermined reference timing until the time to start charging in order to cause the charge start timings of the regulating batteries to coincide; and then sets the calculation results as the wait time of the regulating batteries (Step I2). The reference time is not limited to 2 seconds. For example, the reference time can be made 2 seconds or more.

Battery selection unit 7e2A next sets 2 kW as the discharge output to the regulating batteries (Step I3). When a continuous charge/discharge time at output other than 2 kW (hereinbelow referred to as the "specified output") is used as (a-8) the continuous charge/discharge time at a predetermined output, battery selection unit 7e2A sets the specified output as the discharge output to the regulating batteries.

Battery selection unit 7e2A then supplies result information that indicates the selection results of regulating batteries and the setting results of the discharge output and wait time to instruction control unit 7f.

Upon receiving the result information, instruction control unit 7f, after the passage of the wait time of the regulating batteries that is shown by the result information, transmits to the regulating batteries shown in the result information operation instructions to carry out discharge at the discharge output of 2 kW shown by the result information (Step I4).

The LFC command changes in value, for example, for every established time interval (for example, a time interval no greater than three seconds). As a result, battery selection unit 7e2A, with each change in the value of the LFC command, selects, from among batteries that are selection candidate batteries, regulating batteries as described above, sets the discharge output and wait times, and supplies result information that indicates these results to instruction control unit 7f. Upon receiving the result information, instruction control unit 7f supplies operation instruction to regulating batteries in accordance with the result information as described above.

Operations have been described above regarding a case in which battery selection unit 7e2A receives a supply LFC command, but in a case in which battery selection unit 7e2A receives a demand LFC command (a command to carry out charging of ESs in the LFC region), regulating batteries are caused to be charged in place of being discharged.

Alternatively, if, during regulation of electric power supply and demand that uses regulating batteries in the LFC region, the battery characteristics parameters of regulating batteries that are collected by information collection unit 7b2A indicate the exhaustion of capacity (residual capacity=0) or the full charge (space capacity=0) of the regulating batteries, battery selection unit 7e2A executes Steps H1 and H2 shown in FIG. 15 and then execute the operation shown in FIG. 16.

The effects of the present exemplary embodiment are next described.

According to the present exemplary embodiment, selection unit 7eA uses a battery characteristics range and communication characteristics range, and based on each of the collection results of information collection unit 7b1A and information collection unit 7b2A, selects from among each ES 5a and each ES 6a ESs (batteries) that use communication paths having characteristics within the communication characteristics range and that have characteristics within the battery characteristics range as relevant batteries and selects, from among the relevant batteries, regulating batteries based on predetermined conditions.

As a result, regulating batteries that are used for regulating the electric power of a electric power system are batteries having similar battery characteristics and that use communication paths having similar communication characteristics, and as a result, the variations in characteristics of the communication paths that are used by the regulating batteries and variations in the battery characteristics among the regulating batteries can be reduced. Accordingly, variations of reception conditions for operation instructions that arise from variations in the characteristics of the communication paths used by the regulating batteries and the degradation of the precision of the regulation of electric power supply and demand that arises from the variations in characteristics among batteries that are used for regulating electric power of the electric power system can be suppressed. Still further, because the plurality of regulating batteries are batteries having similar battery characteristics and that use communication paths having similar characteristics, the plurality of regulating batteries can be treated as virtually one battery (a battery cluster).

When selecting relevant batteries using the battery characteristics range and communication characteristics range, the battery characteristics range and communication characteristics range are preferably altered in accordance with the objective of controlling the electric power supply and demand.

For example, in control of electric power supply and demand that requires rapid charging and discharging, a range is used as the battery characteristics range in which the charge/discharge time is shorter than the predetermined standard value of charge/discharge time and in which the charge/discharge output is greater than the predetermined standard value of charge/discharge output, and a range is used as the communication characteristics range in which the communication delay time is shorter than the predetermined standard value of communication delay time.

Further, in control of electric power supply and demand in which the amount of charge/discharge is great but that does not require rapid charging or discharging, a range is used as the battery characteristics range in which the charge/discharge time is longer than the predetermined standard value of charge/discharge time and in which the charge/discharge output is greater than 0, and a range is used as the communication characteristics range in which the communication delay time is longer than 0.

In the present exemplary embodiment, battery selection unit 7e2A may supply the battery characteristics range, the communication characteristics range, the selection results of relevant batteries, and the selection results of regulating batteries to display unit 7g; and display unit 7g may display the battery characteristics range, the communication characteristics range, the selection results of relevant batteries, and the selection results of regulating batteries. In this case, the user of the battery control system is able to check the operating state of the battery control system (the selection results of relevant batteries and selection results of regulating batteries). As a result, the user of the battery control system is able to amend the battery characteristics range and communication characteristics range to adjust the selection results of relevant batteries and the selection results of the regulating batteries when the selection results of relevant batteries and selection results of regulating batteries diverge from the intended results.

In the present exemplary embodiment, information collection unit 7b1A detects, as the characteristics of batteries, at least characteristics relating to charging or discharging of batteries. In addition, the battery characteristics range prescribes at least a range of characteristics that relate to charging or discharging of batteries. As a result, it is possible to select, as regulating batteries, batteries for which the characteristics relating to charging or discharging of batteries are similar, and to suppress the deterioration of precision of the regulation of electric power supply and demand caused by variation of the characteristics of charging and discharging.

The characteristics that relate to charging or discharging of batteries may be prescribed as at least one of: the delay time, which is the time from reception of an operation instruction by a battery until the execution of the operation in accordance with the operation instruction; the maximum continuous charge/discharge time of a battery; the charge/discharge output of a battery; the residual capacity of a battery; the residual space capacity of a battery; the SOC of a battery; and the voltage at the connection point of a battery with an electric power system.

In the present exemplary embodiment, system state measurement unit 7d may be omitted.

Third Exemplary Embodiment

Figure 17:
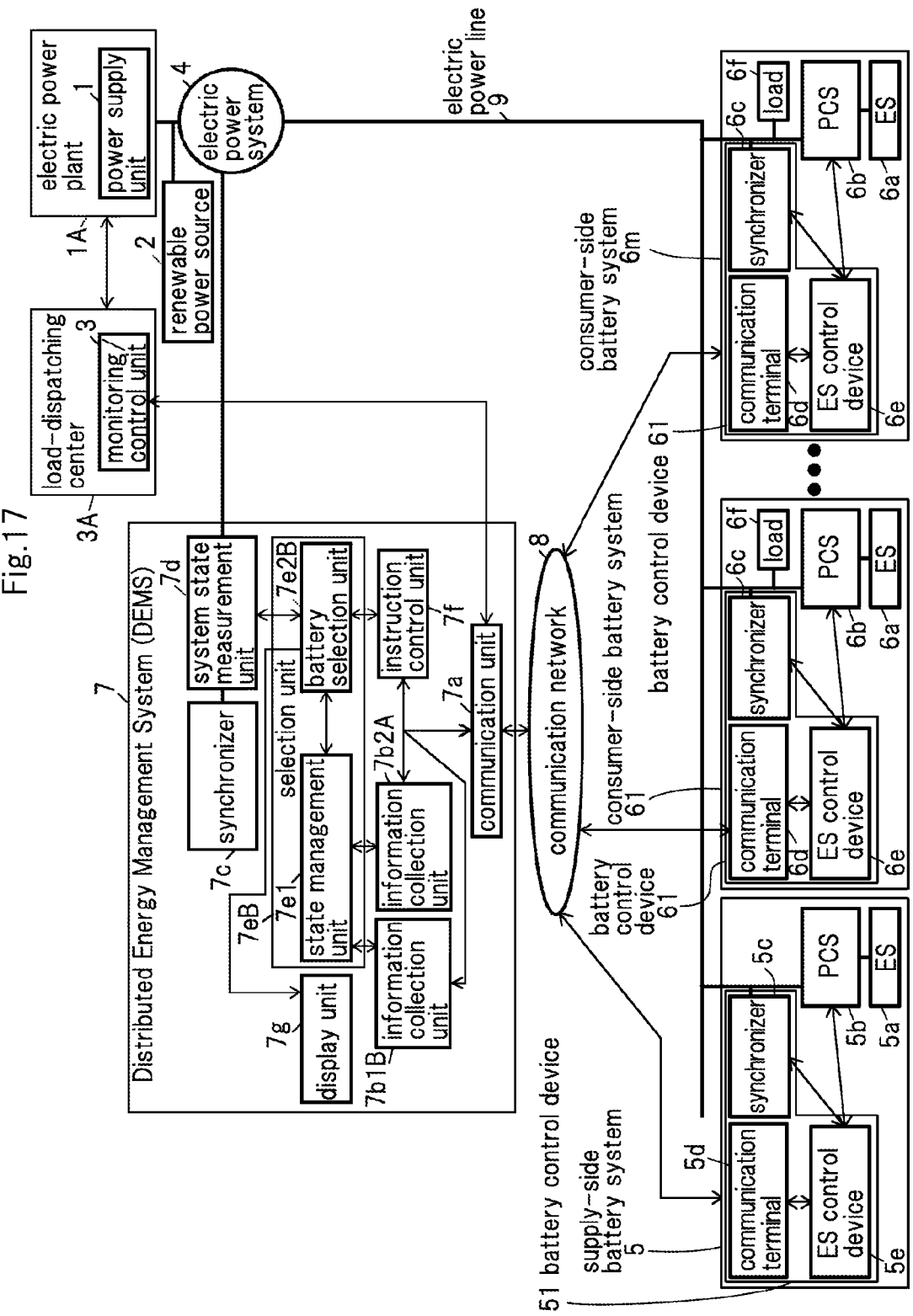
FIG. 17 shows a power control system that adopts the battery control system of the third exemplary embodiment of the present invention.

FIG. 17 shows an electric power control system that adopts the battery control system of the third exemplary embodiment of the present invention. In FIG. 17, constructions that are identical to constructions shown in FIG. 1 are given the same reference numbers. The following explanation of the electric power control system shown in FIG. 17 focuses on points of difference with the electric power control system shown in FIG. 1.

In the electric power control system shown in FIG. 17, each of battery control devices 51 and 61 or each BMU belonging to each ES 5a and each ES 6a recognizes as the characteristics of ES:

(a-1) the residual capacity, and (a-3) the maximum charge/discharge output.

In the electric power control system shown in FIG. 17, information collection unit 7b1B is used in place of information collection unit 7b1 in the first exemplary embodiment shown in FIG. 1, information collection unit 7b2A in the second exemplary embodiment shown in FIG. 14 is used in place of information collection unit 7b2, selection unit 7eB is used in place of selection unit 7e, and battery selection unit 7e2B is used in place of battery selection unit 7e2.

Information collection unit 7b1B collects from ESs 5a and each of ESs 6a the IDs and the battery characteristics parameters that indicate (a-1) the residual capacity and (a-3) the maximum charge/discharge output.

Based on (b-1) the communication delay time that is the detection result of information collection unit 7b2A, battery selection unit 7e2B classifies each ES 5a and each ES 6a into a plurality of groups, and then designates from among this plurality of groups, as the relevant groups, groups that have characteristics within the communication characteristics range that is prescribed in the communication delay time, and then selects, as relevant batteries, ESs that are included in the relevant groups. Battery selection unit 7e2B then selects regulating batteries from among the relevant batteries on the basis of predetermined conditions.

In the present exemplary embodiment, battery selection unit 7e2B refers to the database in state management unit 7e1 to classify each ES into a plurality of groups according to the communication delay time.

Battery selection unit 7e2B then specifies for each group: the communication delay time (the range of (b-1) communication delay times of each ES in a group); the number of ESs; the maximum output ((a-3) and the maximum charge/discharge output realized by each ES in a group); and the amount of electric power that can be supplied (the total electric power amount (the total (a-1) residual capacity) that can be supplied to electric power system 4 by each ES in a group); and saves the specification results in the database in state management unit 7e1.

FIG. 18 shows an example of the specification results in table format.

In FIG. 18, each ES is classified into groups ES 101-ES 104, and the communication delay time, the number of ESs, the maximum output, and the amount of electric power that can be supplied are placed in association with each group name.

Figure 19:
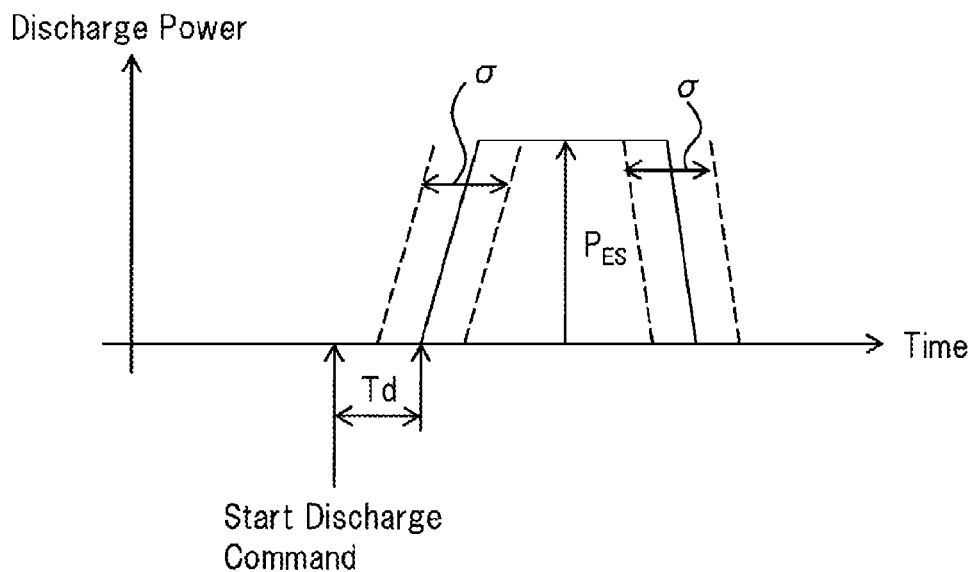
FIG. 19 is a view for describing the discharging operation of ES.

FIG. 19 is a view for describing the discharge operation of ES.

As shown in FIG. 19, an ES receives an operation instruction to discharge (hereinbelow referred to as a "discharge operation instruction") from DEMS 7 at a timing that is delayed by the communication delay time $Td\pm(\sigma/2)$ from the transmission timing of the discharge operation instruction. Upon receiving the discharge operation instruction, the ES starts discharging and discharges predetermined electric power $P_{ES}$ that corresponds to the battery performance capacity. The ES then stops discharge in accordance with an operation halt instruction from DEMS 7.

The dotted lines in FIG. 19 show the amount of variation 6 between the communication delay times within a group.

Figure 20:
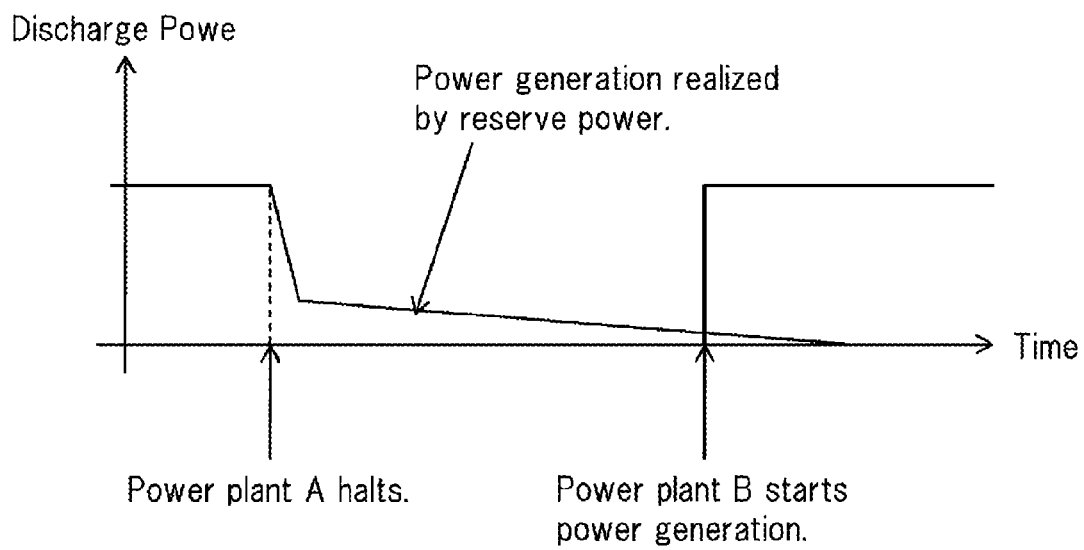
FIG. 20 is a waveform chart that shows an example of a change of the amount of generated power during the suspension of power.

FIG. 20 is a waveform diagram showing an example of the transition of the amount of power generation at the time of the interruption of service.

FIG. 20 shows an example of the transition of the amount of power generation in a period from the time, when power plant A that supplies electric power to the electric power system suspends power generation, to the time when power plant B subsequently begins power generation and supplies electric power to the electric power system.

As shown in FIG. 20, a small amount of electric power is generated in the electric power system after power plant A suspends power generation, but this only indicates the amount of power generation realized by the reserve power provided in the electric power system. "Reserve power" refers to reserve power generation facilities belonging to the electric power system in preparation for suspension of power generation of a power plant. The amount of power generation realized by the reserve power shown in FIG. 20 is a value assumed by the inventors of the present application and does not represent the reserve power of an actual electric power system.

In the electric power control system of the present exemplary embodiment, unbalance in the supply and demand of electric power is reduced by compensating the power, which cannot be compensated by this reserve power, by using each ES.

For example, when the ESs are each classified into four groups as shown in FIG. 18, it is considered that group ES 104, for which the communication delay time is shortest, i.e., that can respond most rapidly to an emergency such as the interruption of service, is normally made up of ESs for which the number of hops required for communication with DEMS 7 is few, the number of the ESs is relatively few, and the amount of electric power that can be supplied is considered to be the least among the four groups.

It is considered that group ES 103 has a communication delay time that is longer than that of group ES 104, but due to an increase of the number of ESs over that of group ES 104, is considered to have a greater amount of electric power that can be supplied.

Similarly, it is considered that group ES 102 has a communication delay time that is longer than that of group ES 103, but due to an increase of the number of ESs over that of group ES 103, is able to supply a greater amount of electric power than group ES 103. Finally, group ES 101, which has an even longer communication delay time, has a longer communication delay time than that of group ES 102, but due to an increase of the number of ESs compared to group ES 102, is considered as able to supply a greater amount of electric power.

Upon receiving, for example, notification from load-dispatching center 3A indicating the suspension of power generation of power plant A and the amount of electric power that is required attendant to the suspension of power generation of power plant A (hereinbelow referred to as the "required amount of electric power"), battery selection unit 7e2B proceeds with specifying relevant groups from among groups ES 101-ES 104 in the order of shorter communication delay times. Battery selection unit 7e2B executes the operation of specifying relevant groups until the total sum of the amount of electric power that can be supplied by the relevant groups is equal to or greater than the required amount of electric power.

In the following explanation, among groups ES 101-ES 104, it is assumed that battery selection unit 7e2B specifies groups ES 101-ES 104 in the order of group ES 104, group ES 103, group ES 102, and group ES 101 as relevant groups.

Battery selection unit 7e2B next selects, as relevant batteries, ESs among the relevant groups, and then selects relevant batteries as regulating batteries and supplies the selection results of regulating batteries to instruction control unit 7f.

Upon receiving the selection results of regulating batteries, instruction control unit 7f transmits discharge operation instructions to the regulating batteries.

Groups ES 101-ES 104 start discharging in the order of group ES 104, group ES 103, group ES 102, and group ES 101 based on the differences among the groups in the communication delay times.

Battery selection unit 7e2B sets the discharge time for each group according to the amount of electric power that can be supplied by each group such that the discharge time of group ES 104 is the shortest, followed by group ES 103, group ES 102, and group ES 101, and instruction control unit 7f transmits discharge operation instructions that include these setting results.

In an actual grouping, the ordering is not necessarily one in which the amount of electric power that can be supplied becomes progressively greater in order from the group having the shortest communication delay time to the group having the longest communication delay time. Accordingly, battery selection unit 7e2B sets the discharge time for each group such that the discharge time becomes successively longer in the order from the group for which the amount of electric power that can be supplied is the least to the group for which the amount of electric power that can be supplied is the greatest.

Figure 21:
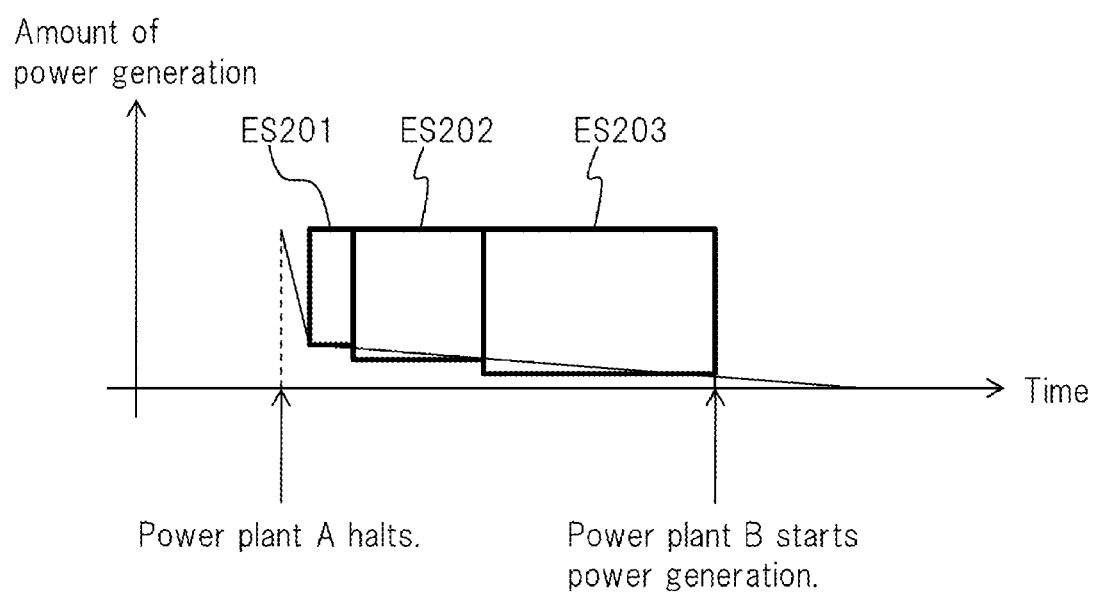
FIG. 21 is a schematic view showing an example of scheduling of discharging times by group at the time of the occurrence of the suspension of power shown in FIG. 20.

FIG. 21 is a schematic view showing an example of a schedule of discharge times for each group at the time of the interruption of service shown in FIG. 20.

Figure 22:
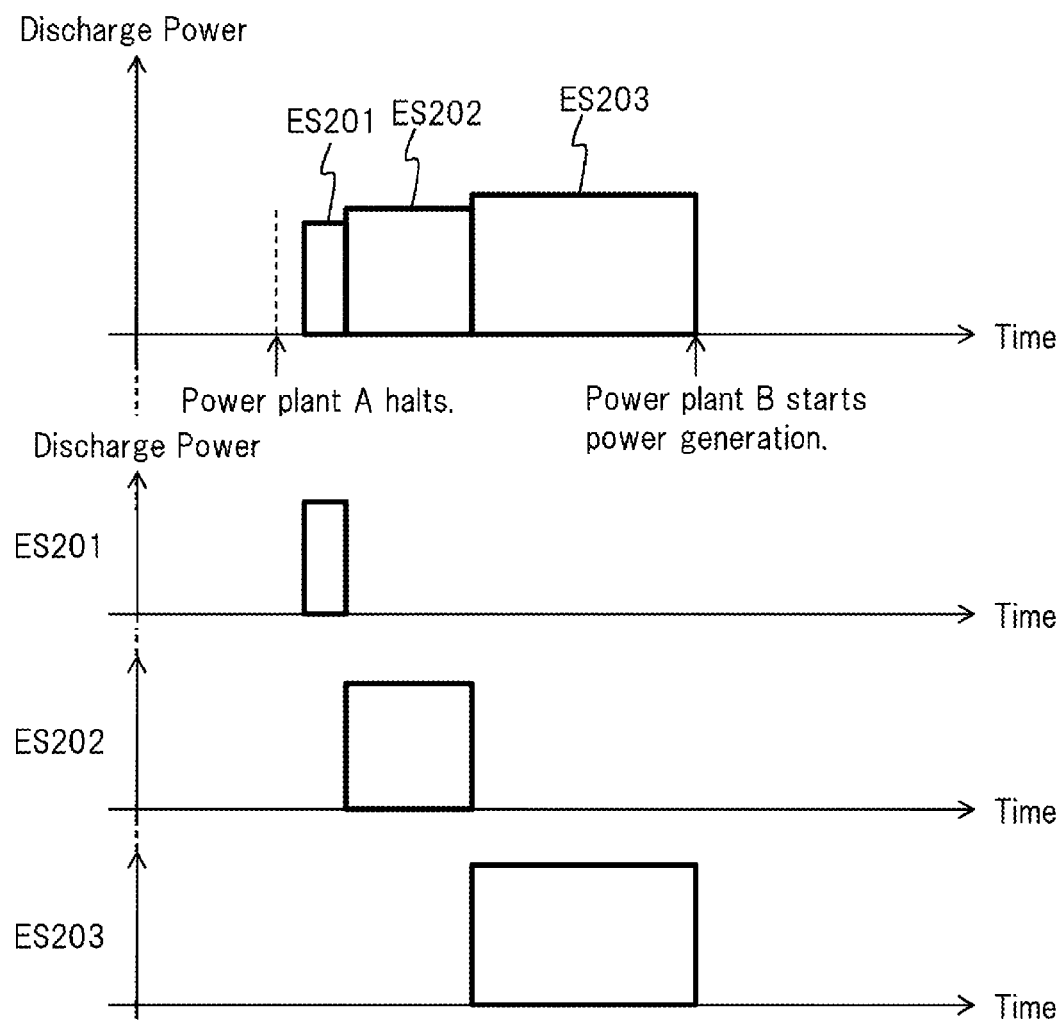
FIG. 22 is a schematic view showing an example of the discharging waveform by group in the schedule shown in FIG. 21.

FIG. 22 is a schematic view showing an example of the discharge waveforms for each group in the schedule shown in FIG. 21.

FIGS. 21 and 22 show examples of a discharge time schedule for each group and discharge waveforms when ESs that are linked to an electric power system are classified into three groups ES 201, ES 202, and ES 203. FIGS. 21 and 22 show an example of discharge waveforms for each group in which the communication delay times become successively longer, and moreover, in which the amount of electric power that can be supplied becomes successively greater in the order of groups ES 201, ES 202, and ES 203.

As shown in FIGS. 21 and 22, in the electric power control system of the present exemplary embodiment, when, for example, power plant A suspends power generation, discharge begins in the order of groups ES 201, ES 202, and ES 203, and moreover, the discharge times are set longer in the order of groups ES 201, ES 202, and ES 203, whereby unbalance of electric power supply and demand of the electric power system is decreased during an interruption of service from the suspension of power generation by power plant A until the start of power generation in power plant B.

According to the electric power control system of the present exemplary embodiment, because the discharge time has been set, not only the discharge start of each ES but the discharge halt time of each ES is controlled at DEMS 7. As a result, there is no need for consideration of which ES discharge operations are to be halted at the starting time of power generation by a power plant for back-up (power plant B).

As long as balance of supply and demand of the electric power system is established, the regulating batteries may be one or more ESs within relevant groups, and there is no need for battery selection unit 7e2B at the time of discharge realized by each group to select as regulating batteries all ESs within relevant groups. When all ESs within relevant groups are to be selected as regulating batteries, the condition that all ESs within the relevant groups be selected as regulating batteries is used as the predetermined condition. When one or more ESs within relevant groups are to be selected as regulating batteries to obtain balance of supply and demand of an electric power system, the condition that one or more ESs within the relevant groups be selected as regulating batteries such that balance of supply and demand of the electric power system is obtained is used as the predetermined condition.

In the present exemplary embodiment, an example was given that assumes a time of an interruption of service in which a power plant suspends power generation and in which the discharge operation of each ES that is linked to the electric power system is controlled, but the electric power control system of the present exemplary embodiment is not limited to being applied to an interruption of service and can also be applied to a case in which, for example, the distributed voltage of an electric power system falls from the proper range (in the case of Japan, a range of 101±6 V for the standard voltage to consumers of 100 V; and 202±20 V for the standard voltage to consumers of 200 V).

The electric power control system of the present exemplary embodiment is not limited to being applied to a case in which the distributed voltage drops, but can also be applied to cases in which the distributed voltage rises and exceeds the above-described proper range. For example, when a multiplicity of photovoltaic generation systems are linked to an electric power system, a large increase in the amount of power generation realized by the photovoltaic generation system may cause the distributed voltage to exceed the above-described proper range. When voltage deviation in which the distributed voltage exceeds the proper range is detected, DEMS 7 should first cause charging of the group having the shortest communication delay time, and then cause charging in successive groups in order from groups having shorter communication delay times to groups having longer communication delay times to increase the amount of power consumption in the electric power system and thus suppress a rise of the distributed voltage. In this case, the charge time for each group should be successively set such that the charging time is shortest for the group for which the amount of power that can be charged is smallest, and the charging time is longest for the group in which the amount of electric power that can be charged is greatest.

By this control of each ES that is linked to the electric power system, the occurrence of voltage deviation in which the distributed voltage exceeds the proper range that is caused by linking a large number of photovoltaic generation systems to an electric power system can be suppressed.

Accordingly, by means of the present exemplary embodiment, an electric power management system is obtained that contributes to the stability of an electric power system.

According to the present exemplary embodiment, battery selection unit 7e2B: classifies each ES 5a and each ES 6a into a plurality of groups based on (b-1) the communication delay times that are the detection results of information collection unit 7b2A; specifies as relevant groups, from among the plurality of groups, groups having characteristics within a communication characteristics range that is stipulated by communication delay times; and selects ESs included within relevant groups as relevant batteries. Then, based on predetermined conditions, battery selection unit 7e2B selects regulating batteries from among the relevant batteries.

As a result, relevant batteries can be selected on a relevant group basis, whereby relevant groups can be treated as virtually single batteries (battery clusters).

In the present exemplary embodiment, system state measurement unit 7d may be omitted.

In each of the above-described exemplary embodiments, the characteristics of batteries (battery characteristics parameters) that are collected by information collection units 7b1, 7b1A, or 7b1B are not limited to those described above and can be altered as appropriate.

For example, the characteristics of batteries that are collected (the battery characteristics parameters) may be any one or more from among the above-described characteristics (battery characteristics parameters), or, for example, may be any one or more of: parameters relating to deterioration of ES (such as service life or temperature), the minimum charge/discharge output of ES, location information of ES, the type of ES, the upper and lower limit values of SOC for the charge state (whether undergoing rapid charging or rated charging), the ON/OFF state of ES, maintenance information of ES (for example, information indicating whether maintenance of ES is carried out at regular intervals or information indicating the times of future maintenance), the amount of active power of charge/discharge of ES, the amount of reactive power of ES, the voltage of ES, and the current of ES.

For example, when the temperature of each ES is collected, battery selection unit 7e2, 7e2A, or 7e2B specifies, from among ESs, ESs having temperatures equal to or higher than a reference temperature as deteriorated batteries, and selects, as relevant batteries, batteries other than deteriorated batteries from among the plurality of ESs.

Alternatively, when maintenance information indicating the times of future maintenance of each ES is collected, battery selection unit 7e2, 7e2A, or 7e2B specifies from among ESs batteries for which the interval from the current date and time until a future maintenance time is shorter than a reference interval as deteriorated batteries, and selects, as relevant batteries, batteries other than deteriorated batteries from among the plurality of ESs.

Alternatively, battery selection unit 7e2, 7e2A, or 7e2B in each of the above-described exemplary embodiments may select candidates of regulating batteries from among each ES for which permission information permitting the use of the ES has been reported to the user (consumer) of the ES. In this case, each ES, for which use is permitted by users (consumers) of the ES, can be used as a regulating battery.

Alternatively, battery selection unit 7e2, 7e2A, or 7e2B in each of the above-described exemplary embodiments may select candidates for regulating batteries, from among each ES for which use permission information that permits the use of a portion of the capacity of charge/discharge of the ES has been reported, and when there is a plurality of regulating batteries, instruction control unit 7f may supply to the plurality of regulating batteries operation instructions that instruct charging or discharging within a range of a portion of the capacity of charge/discharge for which use is permitted. In this case, the regulation of electric power supply and demand can be implemented by using a portion of the capacity of charge/discharge of ES for which use has been permitted to the users (consumers).

Still further, instruction control unit 7f in each of the above-described exemplary embodiments may alter the method of transmitting operation instructions as appropriate.

For example, instruction control unit 7f transmits operation instructions by unicast when the number of regulating batteries is less than the prescribed number, transmits operation instructions by multicast when the number of regulating batteries is equal to or greater than the prescribed number, but transmits operation instructions by broadcast when the number of regulating batteries is equal to or greater than the prescribed number and the instruction content can be made the same.

In each of the above-described exemplary embodiments, the name of the system that manages charging/discharging of batteries was taken as DEMS, but the name of the system that manages charging/discharging of batteries can be altered as appropriate according to the subject that performs management or according to the location of the system. The name of the system that manages charging/discharging of batteries may be, for example, Community EMS, City EMS, Town EMS, or Enterprise EMS.

DEMS 7 may be realized by a computer. The computer in this case, by reading and executing a program that is recorded on a recording medium such as a CD-ROM (Compact Disk Read Only Memory) that can be read by a computer, functions as communication unit 7a, information collection unit 7b1, 7b1A, or 7b1B, information collection unit 7b2 or 7b2A, synchronizer 7c, system state measurement unit 7d, selection unit 7e, 7eA, or 7eB, instruction control unit 7f, and display unit 7g. The recording medium is not limited to a CD-ROM and can be altered as appropriate.

In addition, ES control device 5e or 6e may be realized by a computer. The computer in this case, by reading and executing a program that is recorded on a recording medium that can be read by a computer, functions as ES control device 5e or 6e.

Although the invention of the present application has been described with reference to exemplary embodiments, the invention of the present application is not limited to each of the exemplary embodiments described hereinabove. The configuration and details of the invention of the present application are open to various modifications within the scope of the invention of the present application that will be clear to one of ordinary skill in the art.

This application claims the benefits of priority based on Japanese Patent Application No. 2011-205596 for which application was submitted on Sep. 21, 2011 and incorporates by citation all of the disclosures of that application.

EXPLANATION OF REFERENCE NUMBERS 1 power supply unit
1A electric power plant
2 renewable power source
3 monitoring/control unit
3A load-dispatching center
4 electric power system
5 supply-side battery system
51 battery control device
5a ES
5a1 battery main unit
5a2 BMU
5b PCS
5c synchronizer
5d communication terminal
5e ES control device
6 consumer-side battery system
61 battery control device
6a ES
6b PCS
6c synchronizer
6d communication terminal
6e ES control device
6f load
7 distributed energy management system (DEMS)
7a communication unit
7b1, 7b1A, 7b1B, 7b2, 7b2A information collection unit
7c synchronizer
7d system state measurement unit
7e, 7eA, 7eB selection unit
7e1 state management unit
7e2, 7e2A, 7e2B battery selection unit
7f instruction control unit
7g display unit
8 communication network
9 electric power line

What is claimed is:

1. A battery control system that communicates by way of a communication network with a plurality of batteries that are connected to an electric power system, comprising:
a communication characteristics detection unit that, for each of said plurality of batteries, detects characteristics of communication paths between said batteries and said battery control system within said communication network;
a selection unit which, based on the detection results of said communication characteristics detection unit, selects, from among said plurality of batteries, a battery that uses a communication path having characteristics within a predetermined communication characteristics range, as a regulating battery that is to be used for regulating electric power of said electric power system, and a control unit that supplies operation instructions that instruct charging or discharging to the regulating battery selected in said selection unit, wherein:
said communication characteristics detection unit detects communication delay times on said communication paths as said characteristics of communication paths;
said predetermined communication characteristics range stipulates the range of said communication delay times; and
said selection unit classifies said plurality of batteries into a plurality of groups based on the detection results of said communication characteristics detection unit, selects batteries that are contained in, among said plurality of groups, those groups that use said communication paths that have characteristics within said predetermined communication characteristics range, as candidates of regulating batteries, and selects regulating batteries from among the candidates for regulating batteries based on predetermined conditions.

2. The battery control system as set forth in claim 1, wherein:
said communication characteristics detection unit detects as characteristics of said communication paths at least one of:
communication delay times on said communication paths,
packet error rate on said communication paths, and
bit error rate on said communication paths; and
said predetermined communication characteristics range stipulates the range of at least one characteristic that was detected in said communication characteristics detection unit.

3. The battery control system as set forth in claim 1, further comprising:

a battery characteristics detection unit that detects, for each of said plurality of batteries, characteristics of the battery;

wherein:

said selection unit, based on the detection results of each of said communication characteristics detection unit and said battery characteristics detection unit, selects, from among said plurality of batteries, batteries having characteristics within a predetermined battery characteristics range and that use said communication paths having characteristics within said predetermined communication characteristics range, as candidates of regulating batteries, and selects from among the candidates of regulating batteries based on predetermined conditions.

4. The battery control system as set forth in claim 3, wherein:

said battery characteristics detection unit detects at least characteristics relating to charging or discharging of said batteries as characteristics of said batteries; and said predetermined battery characteristics range stipulates at least a range of characteristics that relate to charging or discharging of batteries.

5. The battery control system as set forth in claim 4, wherein characteristics relating to charging or discharging of said batteries are stipulated by at least one of:

delay time that is the time interval from reception of said operation instruction by said battery until the execution of an operation that corresponds to said operation instruction, maximum continuous charge/discharge time of said batteries, charge/discharge output of said batteries, residual capacity of said batteries, residual space capacity of said batteries, SOC of said batteries, and voltage at the connection point with said electric power system of said batteries.

6. The battery control system as set forth in claim 1, further comprising a display unit that displays said predetermined communication characteristics range, and selection results of said regulating battery.

7. The battery control system as set forth in claim 3, further comprising a display unit that displays said predetermined communication characteristics range, said predetermined battery characteristics range, selection results of candidates of said regulating batteries, and selection results of said regulating batteries.

8. A battery control method of a battery control system that communicates by way of a communication network with a plurality of batteries that are connected to an electric power system, said battery control method comprising:

for each of said plurality of batteries, detecting characteristics of communication paths between said batteries and said battery control system within said communication network;

selecting, from among said plurality of batteries, each battery that uses a communication path having characteristics within a predetermined communication characteristics range, as a regulating battery that is to be used for regulating electric power of said electric power system; and supplying, to said regulating battery, operation instructions that instruct charging or discharging, wherein:

said characteristics detecting detects communication delay times on said communication paths as said characteristics of communication paths;

said predetermined communication characteristics range stipulates the range of said communication delay times; and said selecting classifies said plurality of batteries into a plurality of groups based on the detection results of said characteristics detecting, selects batteries that are contained in, among said plurality of groups, those groups that use said communication paths that have characteristics within said predetermined communication characteristics range, as candidates of regulating batteries, and selects regulating batteries from among the candidates for regulating batteries based on predetermined conditions.

9. A computer readable recording medium on which a program is recorded that causes a computer to execute:

a communication characteristic detection procedure of detecting, for each of a plurality of batteries that are connected to an electric power system, characteristics of communication paths between the batteries and said computer;

a selection procedure of selecting, from among said plurality of batteries, a battery that uses a communication path having characteristics within a predetermined communication characteristics range, as a regulating battery that is to be used for regulating electric power of said electric power system, and a control procedure of supplying to said regulating battery operation instructions that instruct charging or discharging, wherein:

said communication characteristics detecting detects communication delay times on said communication paths as said characteristics of communication paths;

said predetermined communication characteristics range stipulates the range of said communication delay times; and said selecting classifies said plurality of batteries into a plurality of groups based on the detection results of said communication characteristics detecting, selects batteries that are contained in, among said plurality of groups, those groups that use said communication paths that have characteristics within said predetermined communication characteristics range, as candidates of regulating batteries, and selects regulating batteries from among the candidates for regulating batteries based on predetermined conditions.

10. An electric power control system having a battery control system that communicates by way of a communication network with a plurality of batteries that are connected to an electric power system, and a battery control device that controls the operation of a battery that is connected to an electric power system, wherein:

the electric power control system comprises:

a communication characteristics detection unit that, for each of said plurality of batteries, detects characteristics of communication paths between said batteries and said battery control system within said communication network;

a selection unit which, based on the detection results of said communication characteristics detection unit, selects, from among said plurality of batteries, a battery that uses a communication path having characteristics within a predetermined communication characteristics range, as a regulating battery that is to be used for regulating electric power of said electric power system, and a system control unit that supplies operation instructions that instruct charging or discharging of the regulating battery selected in said selection unit; and the battery control device comprising:

a communication unit, and a device control unit that, when said communication unit receives inspection information for detecting characteristics of a communication path that is being used by said battery, transmits predetermined information from said communication unit to a transmission origin of said inspection information, and when said communication unit receives an operation instruction that prescribes an operation of charging or discharging of said battery, controls said battery based on the operation instruction wherein:

said communication characteristics detection unit detects communication delay times on said communication paths as said characteristics of communication paths;

said predetermined communication characteristics range stipulates the range of said communication delay times; and said selection unit classifies said plurality of batteries into a plurality of groups based on the detection results of said communication characteristics detection unit, selects batteries that are contained in, among said plurality of groups, those groups that use said communication paths that have characteristics within said predetermined communication characteristics range, as candidates of regulating batteries, and selects regulating batteries from among the candidates for regulating batteries based on predetermined conditions.

* * * * *